(12) United States Patent
Chicote et al.

(10) Patent No.: US 11,373,633 B2
(45) Date of Patent: Jun. 28, 2022

(54) TEXT-TO-SPEECH PROCESSING USING INPUT VOICE CHARACTERISTIC DATA

(71) Applicant: Amazon Technologies, Inc., Seattle, WA (US)

(72) Inventors: Roberto Barra Chicote, Cambridge (GB); Vatsal Aggarwal, Cambridge (GB); Andrew Paul Breen, Norwich (GB); Javier Gonzalez Hernandez, Cambridge (GB); Nishant Prateek, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/586,007

(22) Filed: Sep. 27, 2019

(65) Prior Publication Data

US 2021/0097976 A1 Apr. 1, 2021

(51) Int. Cl.
| | |
|---|---|
| *G10L 13/033* | (2013.01) |
| *G10L 13/047* | (2013.01) |
| *G10L 15/18* | (2013.01) |
| *G10L 13/10* | (2013.01) |
| *G06F 40/30* | (2020.01) |

(52) U.S. Cl.
CPC .............. *G10L 13/10* (2013.01); *G06F 40/30* (2020.01); *G10L 13/033* (2013.01); *G10L 13/047* (2013.01)

(58) Field of Classification Search
CPC ....... G10L 13/00; G10L 13/02; G10L 13/033; G10L 13/08; G10L 13/10; G10L 13/047; G10L 15/18

USPC .......... 704/258, 260, 269, 257, 259
See application file for complete search history.

(56) References Cited

U.S. PATENT DOCUMENTS

| | | | | |
|---|---|---|---|---|
| 5,933,805 | A * | 8/1999 | Boss | G10L 19/0018 704/223 |
| 6,334,104 | B1 * | 12/2001 | Hirai | G10L 13/047 704/260 |
| 10,108,606 | B2 * | 10/2018 | Yun | G10L 13/0335 |
| 2002/0055843 | A1 * | 5/2002 | Sakai | G10L 13/00 704/258 |

(Continued)

FOREIGN PATENT DOCUMENTS

| | | |
|---|---|---|
| KR | 20190096877 A | 8/2019 |
| KR | 20190104269 A | 9/2019 |

OTHER PUBLICATIONS

Ramos Sanchez, International Search Report and Written Opinion dated Dec. 11, 2020 in International Application No. PCT/US/2020/051234, 11 pages.

(Continued)

*Primary Examiner* — Martin Lerner
(74) *Attorney, Agent, or Firm* — Pierce Atwood LLP

(57) ABSTRACT

During text-to-speech processing, a speech model creates synthesized speech that corresponds to input data. The speech model may include an encoder for encoding the input data into a context vector and a decoder for decoding the context vector into spectrogram data. The speech model may further include a voice decoder that receives vocal characteristic data representing a desired vocal characteristic of synthesized speech. The voice decoder may process the vocal characteristic data to determine configuration data, such as weights, for use by the speech decoder.

24 Claims, 14 Drawing Sheets

(56) References Cited

U.S. PATENT DOCUMENTS

| | | | | |
|---|---|---|---|---|
| 2006/0229863 | A1* | 10/2006 | McCuller | G10L 13/033 704/4 |
| 2014/0207462 | A1* | 7/2014 | Bangalore | G10L 13/08 704/260 |
| 2016/0093284 | A1* | 3/2016 | Begum | G10L 13/047 704/260 |
| 2016/0379638 | A1* | 12/2016 | Basye | G10L 13/02 704/235 |
| 2017/0162187 | A1* | 6/2017 | Ohtani | G10L 13/047 |
| 2017/0270907 | A1* | 9/2017 | Mori | G10L 13/033 |
| 2018/0096677 | A1* | 4/2018 | Pollet | G10L 13/08 |
| 2018/0114522 | A1* | 4/2018 | Hall | G10L 13/047 |
| 2018/0268806 | A1* | 9/2018 | Chun | G10L 13/047 |
| 2018/0330713 | A1* | 11/2018 | Hoory | G10L 13/033 |
| 2018/0336880 | A1* | 11/2018 | Arik | G10L 13/08 |
| 2019/0019497 | A1* | 1/2019 | Shin | G10L 13/047 |
| 2019/0115008 | A1* | 4/2019 | Jiang | G10L 13/033 |
| 2019/0251952 | A1* | 8/2019 | Arik | G10L 13/033 |
| 2019/0272818 | A1* | 9/2019 | Fernandez | G10L 13/047 |
| 2019/0287513 | A1 | 9/2019 | Alameh et al. | |
| 2020/0005763 | A1 | 1/2020 | Chae et al. | |
| 2020/0005764 | A1 | 1/2020 | Chae et al. | |
| 2020/0012675 | A1* | 1/2020 | Ye | G10L 15/1815 |
| 2020/0013388 | A1* | 1/2020 | Lee | G10L 13/02 |
| 2020/0051583 | A1* | 2/2020 | Wu | G10L 13/047 |
| 2020/0211528 | A1* | 7/2020 | Lee | G10L 13/02 |
| 2020/0211540 | A1* | 7/2020 | Maconnell | G10L 13/00 |
| 2020/0279553 | A1* | 9/2020 | McDuff | G10L 13/027 |
| 2020/0342848 | A1* | 10/2020 | Daido | G10L 13/033 |
| 2020/0372897 | A1* | 11/2020 | Battenberg | G10L 13/033 |
| 2021/0090549 | A1* | 3/2021 | Lombardo | G10L 13/033 |
| 2021/0142783 | A1* | 5/2021 | Kim | G10L 13/033 |
| 2021/0375290 | A1* | 12/2021 | Hu | G10L 13/04 |

OTHER PUBLICATIONS

International Preliminary Report on Patentability dated Apr. 7, 2022 for International Patent Application No. PCT/US2020/051234.

* cited by examiner

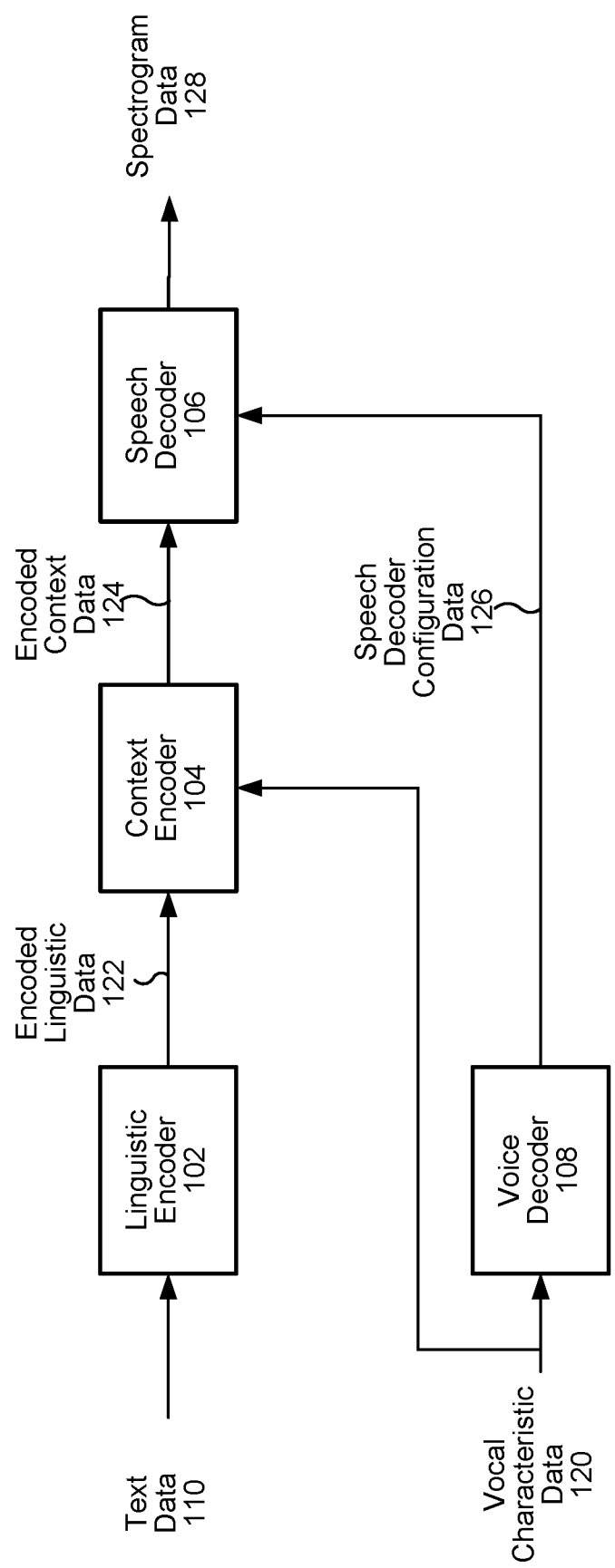

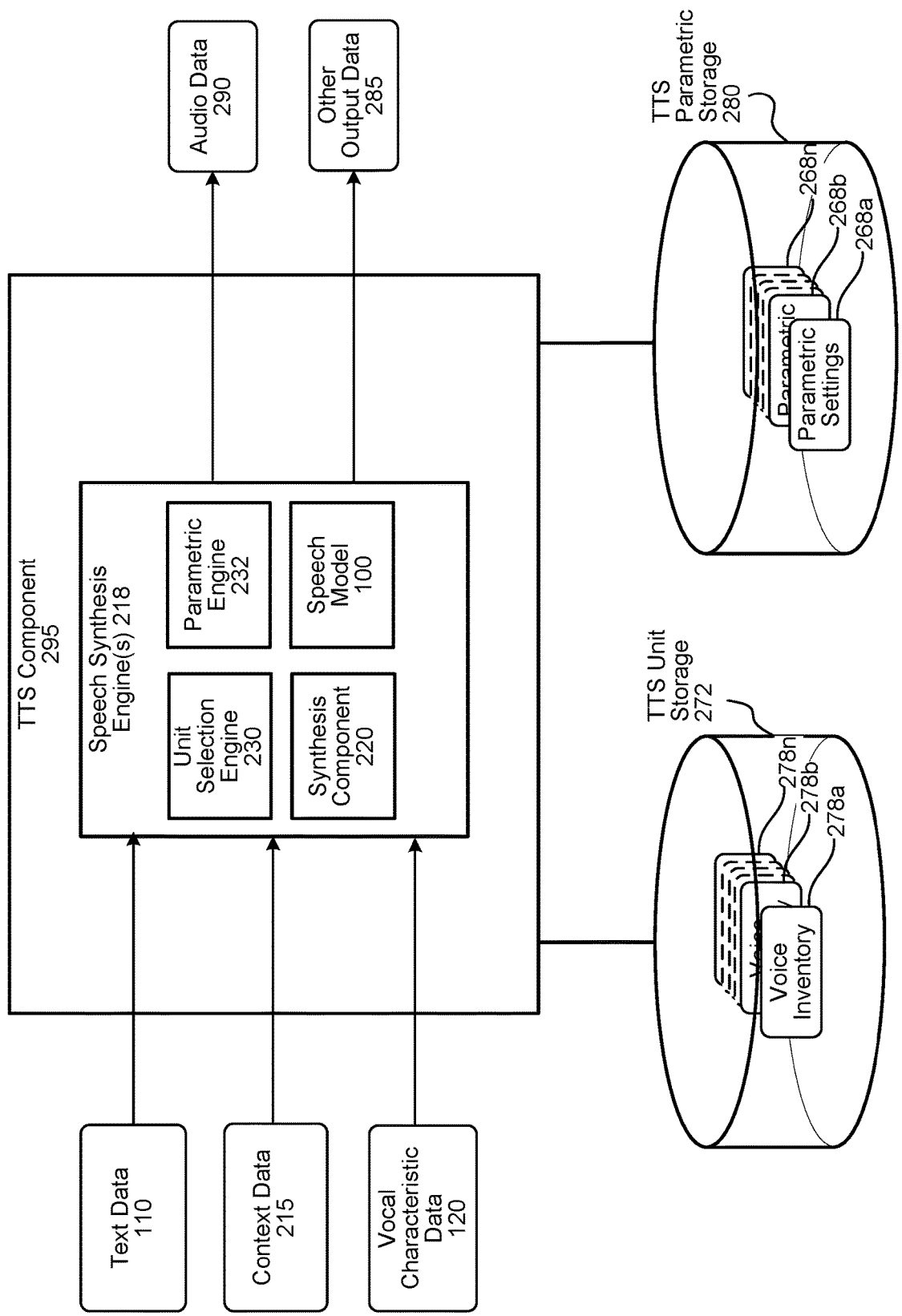

TEXT-TO-SPEECH PROCESSING USING INPUT VOICE CHARACTERISTIC DATA

BACKGROUND

Text-to-speech (TTS) systems convert written text into sound. This conversion may be useful to assist users of digital text media by synthesizing speech representing text displayed on a computer screen. Speech-recognition systems have progressed to a point at which humans may interact with and control computing devices by voice. TTS and speech recognition, combined with natural language understanding processing techniques, enable speech-based user control and output of a computing device to perform tasks based on the user's spoken commands. The combination of speech recognition and natural-language understanding processing is referred to herein as speech processing. TTS and speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a speech model for performing text-to-speech (TTS) processing according to embodiments of the present disclosure.

FIG. 2 illustrates components of a system for performing TTS processing according to embodiments of the present disclosure.

DETAILED DESCRIPTION

Figure 3A:
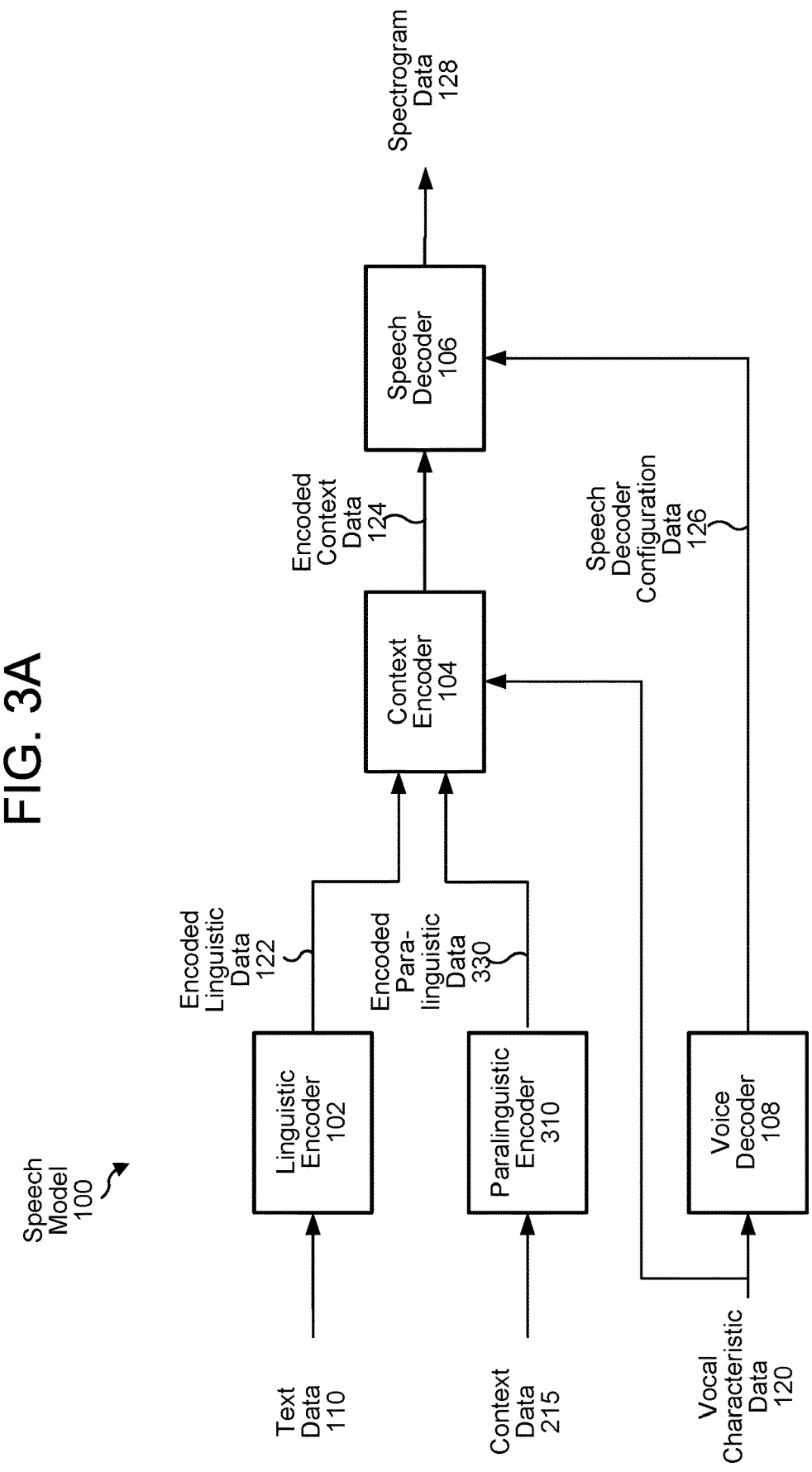
FIGS. 3A and 3B illustrate components of a system for generating spectrogram data using vocal characteristic data according to embodiments of the present disclosure.

Text-to-speech (TTS) processing systems may employ one or more of various techniques to generate synthesized speech from text; example techniques are described in more detail herein. For example, a speech model may be trained to generate audio output waveforms given input data representing speech, such as text data. The speech model may be trained to generate audio output that resembles the speaking style, tone, accent, or other vocal characteristic(s) of a particular speaker using training data from one or more human speakers. The speech model may create tens of thousands of samples per second of audio; in some embodiments, the rate of output audio samples is 16 kilohertz (kHz). The speech model may be probabilistic and/or autoregressive; the predictive distribution of each audio sample may be conditioned on previous audio samples. As explained in further detail below, the speech model may use causal convolutions to predict output audio; in some embodiments, the model uses dilated convolutions to generate an output sample using a greater area of input samples than would otherwise be possible. The speech model may be trained using a conditioning network that conditions hidden layers of the network using linguistic context features, such as phoneme data. The audio output generated by the model may have higher audio quality than either unit selection and/or parametric synthesis.

This type of direct generation of audio waveforms using a speech model may utilize training data consisting of recorded human speech and corresponding text to train the speech model. Synthesized speech subsequently generated using the speech model may exhibit the vocal characteristics inherent in the human speech. For example, if the human speech had a particular accent, the synthesized speech may also exhibit that accent. Synthesized speech having a different vocal characteristic may be generated by training a speech model with other training data.

The present disclosure relates to systems and methods for synthesizing speech from first input data (e.g., text data) using one or more vocal characteristics represented in second input data (e.g., audio recordings of people speaking, a textual description of a style of speaking, and/or a picture of a particular speaker). In various embodiments, the description of a voice is received; this voice description may include text data, speech data, or other data that describes vocal characteristics of a desired voice. These vocal characteristics may include a desired age, gender, accent, accent, and/or emotion. For example, the system may receive input data that represents the request: "Generate speech that sounds like a 40-year-old news anchor." In other embodiments, a sample of a voice is received (from, e.g., a user); this voice sample may include speech data representing speech that has vocal characteristics resembling those desired by the user. For example, the system may receive speech data that represents the request, "Generate speech that sounds like this: 'Hasta la vista, baby,' in which the phrase "Hasta la vista, baby' is spoken in an Arnold Schwarzenegger-sounding accent. The system may receive image data that includes an image of Arnold Schwarzenegger and determine based thereon that the vocal characteristics include an Arnold Schwarzenegger-sounding accent.

A vocal characteristic component may be used to process the input received (whether the input is a voice description and/or a voice sample) and generate corresponding vocal characteristic data. The vocal characteristic data may be a plurality of numbers that, where each number represents a particular vocal characteristic. For example, the vocal characteristic data may be a vector of 20 floating-point numbers. The vocal characteristic data component may be a trained model, such as a feedforward or recurrent network. A speech model may then use the vocal characteristic data to generate, from received text data, spectrogram data corresponding to the text data using the vocal characteristics represented by the vocal characteristic data. The spectrogram data may then be used to generate output audio. In various embodiments, the speech model is a sequence-to-sequence ("seq2seq") model that includes an encoder and a speech decoder. The encoder may include a linguistic encoder that generates encoded linguistic features from the text data; these encoded linguistic features may represent vocal characteristics such as tone, pitch, and cadence. The encoder may further include a paralinguistic encoder that generates encoded paralinguistic features from the text data; these encoded paralinguistic features may represent higher-level characteristics such as emotion, urgency, and mood. A context encoder may generate encoded context data using the encoded linguistic features, encoded paralinguistic features, and voice data. The speech decoder may generate the spectrogram data using the encoded context data. A voice decoder may generate speech-decoder configuration data, which may include one or more weights, using the voice data. The speech decoder may be configured using the generate speech-decoder configuration data by, for example, using the one or more weights.

Referring to FIG. 1, the speech model 100 may include a linguistic encoder 102 for encoding data into one or more vectors represented in encoded linguistic data 122. A context encoder may be used to determine encoded context data 124 from the encoded linguistic data 122 and vocal characteristic data 120. A speech decoder 106 may receive the encoded context data 124 and create corresponding spectrogram data 128, which then may be used to create synthesized speech. In various embodiments, the encoders 102, 104 step through input time steps and encode input text data 110 into a fixed length vector called a context vector; the speech decoder 106 steps through output time steps while reading the context vector to create the spectrogram data 128.

The speech model 100 may receive vocal characteristic data 120. The vocal characteristic data 120 may be one or more numbers arranged in a vector. Each number in the vector may represent a value denoting a particular vocal characteristic. A value may be a binary value to denote a yes/no vocal characteristic, such as "male" or "female." A value may be an integer value to denote other vocal characteristics, such as age. Other values may be one number in a range of values to represent a degree of a vocal characteristic, such as "coarseness" or "speed." In some embodiments, the vocal characteristic data 120 includes natural-language descriptions of vocal characteristics in lieu of numbers representing them. The vocal characteristic data 120 may be a fixed size (e.g., a vector having a dimension of 20 elements) or may vary in size. The size of the vocal characteristic data 120, and the vocal characteristics it represents, may be the same for all received text data 110 or may vary with different text data 110. For example, first vocal characteristic data 120 may correspond to "male, old, angry" while second vocal characteristic data 120 may correspond to "female, French accent."

A voice decoder 108 processes the vocal characteristic data 120 to determine speech-decoder configuration data 126. The speech-decoder configuration data 126 may be one or more model weights; the speech decoder 106 may use the one or more model weights on one or more nodes to process the encoded context data 124. That is, the speech decoder 106 may use the model weights in the speech-decoder configuration data 126 in lieu of one or more model weights previously determined by a model-training process. The speech decoder 106 may instead or in addition use the model weights in the speech-decoder configuration data 126 to modify one or more model weights previously determined by a model-training process. The speech-decoder configuration data 126 may further include instructions to modify one or more model weights previously determined by a model-training process. The speech-decoder configuration data 126 may further include instructions to reconfigure the speech decoder 106 to enable or disable processing of the encoded context data 124 by one or more nodes of the speech decoder 106.

The linguistic encoder 102 may process input text data 110 to determine encoded linguistic data 122, which may be a set of numbers arranged in a vector that represents the aggregated sum of a string of words represented in the text data 110. For example, if the words in the text data 110 are "Hello, world," the encoded linguistic data 122 may be a vector of numbers that represents both words "hello" and "world." A context encoder 104 may process the encoded linguistic data 122 and the vocal characteristic data 120 to determine encoded context data 124. The encoded context data 124 may thus include a representation of the text data 110 as influenced by the vocal characteristic data. The encoded context data 124 may represent, for example, modified encoded linguistic data 122 that includes how the text data 110 may be pronounced in accordance with the vocal characteristic data 120. The encoded context data 124 may thus represent an encoding of the text data as well as an encoding of pronunciation metadata, such as syllable emphasis data or language-accent data.

The speech decoder 106 receives the encoded context data 124 and processes it in accordance with the speech decoder configuration data 126, as described herein. In some embodiments, the speech decoder 106 replaces or modifies one or more model weights as specified by model weights and/or weight modification instructions represented by the speech decoder configuration data 126. The speech decoder 106 may also or instead activate or deactivate one or more nodes as specified by the speech decoder configuration data 126.

The linguistic encoder 102, context encoder 104, speech decoder 106, and/or voice decoder 108 may be trained as described herein. In particular, they may be trained using training data including a number of pre-generated examples of text data 110 and corresponding spectrogram data 128. Each instance of text data 110 may have a number of different examples of corresponding spectrogram data 128; each example of spectrogram data 128 may be classified as possessing a number of different vocal characteristics, for which corresponding vocal characteristic data 120 may be determined. The linguistic encoder 102, context encoder 104, speech decoder 106, and/or voice decoder 108 may thus be trained together using the example text data 110 and determined vocal characteristic data 120 as input and using the corresponding spectrogram data 128 to assess the output spectrogram data 128. Node weights of each of the linguistic encoder 102, context encoder 104, speech decoder 106, and/or voice decoder 108 may thus be updated using, for example, a gradient descent algorithm, and the newly determined weights may be back-propagated to each of the linguistic encoder 102, context encoder 104, speech decoder 106, and/or voice decoder 108, as necessary. In other embodiments, however, one or more of the linguistic encoder 102, context encoder 104, speech decoder 106, and/or voice decoder 108 may be trained separately from the other components using predetermined examples of input and output data.

FIG. 2 illustrates components of a system that may be used to perform unit selection, parametric TTS processing, and/or speech model-based audio synthesis of text data 110 using vocal characteristic data 120. In various embodiments of the present invention, model-based synthesis of audio data may be performed using a TTS component 295 that may include a TTS front end, a speech synthesis engine 218, and a TTS back end. As shown in FIG. 2, the TTS component/processor 295 may further include a TTS unit storage 272 and a TTS parametric storage 280. The TTS unit storage 272 may include, among other things, voice inventories 278*a*-288*n* that may include pre-recorded audio segments (called units) to be used by the unit selection engine 230 when performing unit selection synthesis as described below. The TTS parametric storage 280 may include, among other things, parametric settings 268*a*-268*n* that may be used by the parametric synthesis engine 232 when performing parametric synthesis as described below. A particular set of parametric settings 268 may correspond to a particular voice profile (e.g., whispered speech, excited speech, etc.). The speech model 100 may be used to synthesize speech without requiring the TTS unit storage 272 or the TTS parametric storage 280, as described in greater detail below.

In some embodiments, the speech synthesis engine 218 processes the text data 110, vocal characteristic data 120, and/or the context data 215. In other embodiments, a TTS front end may be used to first transform the text data 110 (which may be received from, for example, an application, user, device, or other text source) into a symbolic linguistic representation, which may include linguistic context features such as phoneme data, punctuation data, syllable-level features, word-level features, and/or emotion, speaker, accent, or other features for processing by the speech synthesis engine 218. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the input text data 110, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end may also process context data 215, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the input text data 110 and/or the text for a TTS request may be accompanied by separate metadata indicating what text should be whispered (or have some other indicated audio characteristic). The speech synthesis engine 218 may compare the annotated phonetic units models and information stored in the TTS unit storage 272 and/or TTS parametric storage 280 for converting the input text into speech. The TTS front end and speech synthesis engine 218 may include their own controller(s)/processor(s) and memory or they may use the controller/processor and memory of server system, user device, or other device, for example. Similarly, the instructions for operating the TTS front end and speech synthesis engine 218 may be located within the TTS component 295, within the memory and/or storage of the system, user device, or within an external device.

Text data 110 input into the TTS component 295 may be sent to the TTS front end for processing. The front end may include components for performing text normalization, linguistic analysis, linguistic prosody generation, or other such components. During text normalization, the TTS front end may first process the text input and generate standard text, converting such things as numbers, abbreviations (such as Apt., St., etc.), symbols ($, %, etc.) into the equivalent of written out words.

During linguistic analysis, the TTS front end may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 295 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage component 272. The linguistic analysis performed by the TTS front end may also identify different grammatical components such as prefixes, suffixes, phrases, punctuation, syntactic boundaries, or the like. Such grammatical components may be used by the TTS component 295 to craft a natural-sounding audio waveform output. The language dictionary may also include letter-to-sound rules and other tools that may be used to pronounce previously unidentified words or letter combinations that may be encountered by the TTS component 295. Generally, the more information included in the language dictionary, the higher quality the speech output.

Based on the linguistic analysis, the TTS front end may then perform linguistic prosody generation where the phonetic units are annotated with desired prosodic characteristics, also called acoustic features, which indicate how the desired phonetic units are to be pronounced in the eventual output speech. During this stage, the TTS front end may also consider and incorporate any prosodic annotations that accompanied the text input to the TTS component 295. Such acoustic features may include syllable-level features, word-level features, emotion, speaker, accent, language, tone, pitch, rate of change of pitch (first derivative of pitch), speed, prosody/intonation, resonance, energy/volume, hesitation, phrasing, nasality, breath, whether the speech includes a cough, sneeze, laugh or other non-speech articulation (which are commonly ignored by ASR systems), detected background audio/noises, distance between the user and a device, duration, and the like. Application of acoustic features may be based on prosodic models available to the TTS component 295. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end, which may be referred to as a symbolic linguistic representation, may include a sequence of phonetic units annotated with prosodic characteristics. This symbolic linguistic representation may be sent to the speech synthesis engine 218 for conversion into an audio waveform of speech for output to an audio output device Such speech may be configured to have vocal characteristics corresponding to the vocal characteristic data 120 without attempting to mimic a particular human voice.

The speech synthesis engine 218 may perform speech synthesis using one or more different methods. In one method of synthesis called unit selection, described further below, a unit selection engine 230 matches the symbolic linguistic representation created by the TTS front end against a database of recorded speech, such as a database (e.g., TTS unit storage 272) storing information regarding one or more voice corpuses (e.g., voice inventories 278$a$-$n$). Each voice inventory may correspond to various segments of audio that was recorded by a speaking human, such as a voice actor, where the segments are stored in an individual inventory 278 as acoustic units (e.g., phonemes, diphones, etc.). Each stored unit of audio may also be associated with an index listing various acoustic properties about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 230 may then use the information about each unit to select units to be joined together to form the speech output.

The unit selection engine 230 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 220) to form output audio data 290 representing synthesized speech. The TTS component 295 may also output other output data 285. Using all the information in the unit database, a unit selection engine 230 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis called parametric synthesis, parameters such as frequency, volume, noise, are varied by a parametric synthesis engine 232, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 220) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 295 may be configured to perform TTS processing in multiple languages. For each language, the TTS component 295 may include specially configured data, instructions, and/or components to synthesize speech in the desired language(s). To improve performance, the TTS component 295 may revise/update the contents of the TTS storage 280 based on feedback of the results of TTS processing, thus enabling the TTS component 295 to improve speech synthesis.

The TTS storage component 295 may be customized for an individual user based on his/her individualized desired speech output. In particular, the speech unit stored in a unit database may be taken from input audio data of the user speaking. For example, to create the customized speech output of the system, the system may be configured with multiple voice inventories 278$a$-278$n$, where each unit database is configured with a different "voice" to match desired speech qualities. Such voice inventories may also be linked to user accounts. The voice selected by the TTS component 295 may be used to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 278 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 268) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. First a unit selection engine 230 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 230. As part of unit selection, the unit selection engine 230 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 272 or in another storage component. For example, different unit selection databases may be stored in TTS unit storage 272. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 218 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

The parametric synthesis engine 232 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 218, the state may change or stay the same, based on the processing of the new text. For example, the pronunciation of a previously processed word might change based on later processed words. A Viterbi algorithm may be used to find the most likely sequence of states based on the processed text. The HMMs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 232 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 232 may lead to a number of potential audio output sequences. Based on the acoustic model and other potential models, the potential audio output sequences may be scored according to a confidence level of the parametric synthesis engine 232. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 268, which may represent acoustic settings matching a particular parametric "voice", may be used by the synthesis component 220 to ultimately create the output audio data 290.

Figure 3B:
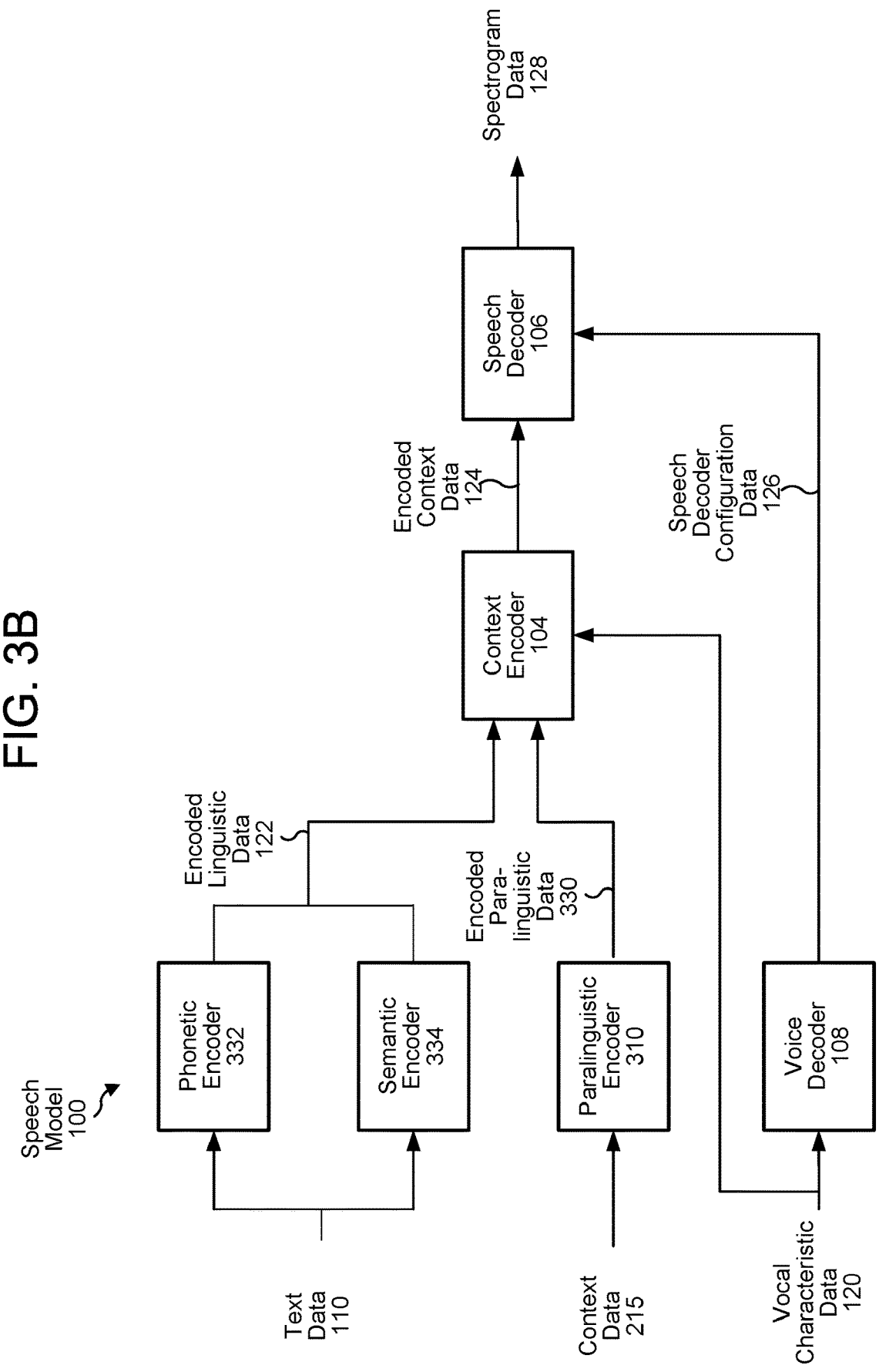

Referring to FIG. 3A, the speech model 100 may further include a paralinguistic encoder 310 that processes context data 215 to determine encoded paralinguistic data 330, which may be further processed by the context encoder 104. The context data 215 may represent properties of the text data 110 other than the text itself, such as vocal characteristics. In some embodiments, the context data 215 is determined using the text data 110 using word spellings, keywords, or sentence structure of the text data 110. For example, if the text data 110 includes terms associated with a sport, the context data 215 may include an indication that the text data 110 should be processed such that the spectrogram data 128 includes vocal characteristics associated with a sports announcer. If the text data 110 includes word spellings indicative of a certain accent, such as words spelled in British English, the context data 215 may include an indication that the text data 110 should be processed such that the spectrogram data 128 includes vocal characteristics associated with that accent. If the text data 110 includes mostly short, simple sentences, the context data 215 may include an indication that the text data 110 should be processed such that the spectrogram data 128 includes vocal characteristics associated a child. The context data 215 may include some or all of the vocal characteristic data 120. Referring to FIG. 3B, the speech model may include a phonetic encoder 332 and semantic encoder 334 in lieu of the linguistic encoder 102. By thus separating different functions of the linguistic encoder 102, the phonetic encoder 332 may determine portions of the encoded linguistic data 122 associated with phones (e.g., sounds associated with the text data 110), while the semantic encoder 334 may determine portions of the encoded linguistic data associated with semantics (e.g., meanings of words represented in the text data 110).

In some embodiments, the speech decoder 106 and/or other component processes the spectrogram data 128 to include information identifying it as synthesized speech. This information may be, for example, a tone or tones at a frequency outside a frequency range of human hearing (20 Hz-20 kHz). The tone or tones may change over time. When a user device 710 receives and/or outputs the modified synthesized speech, it may first check to see if the identifying information is present. If present, the user device 710 may refuse to receive and/or output the modified synthesized speech, output an indication that the speech is synthesized, and/or send an indication to another system.

In various embodiments, the speech model 100 receives as input instead of or in addition to the text data 110 and/or context data 215 other types of input data, such as audio data or video data. The speech model 100 may process this input data as it does the text data as described herein to produce output data. The output data may be the spectrogram data 128, text data, video data, or other data. Similarly, the vocal characteristic component 402 may output, instead of or in addition to the vocal characteristic data 120, other characteristic data, such as video data, which may be processed by the speech model 100. The present disclosure is thus not limited to generating audio data from text data using vocal characteristics. In various embodiments, the model 100 may, for example, generate video data depicting images of gestures, such as a human dancing, wherein the gestures exhibit characteristics as defined by the characteristic component 402.

Figure 4:
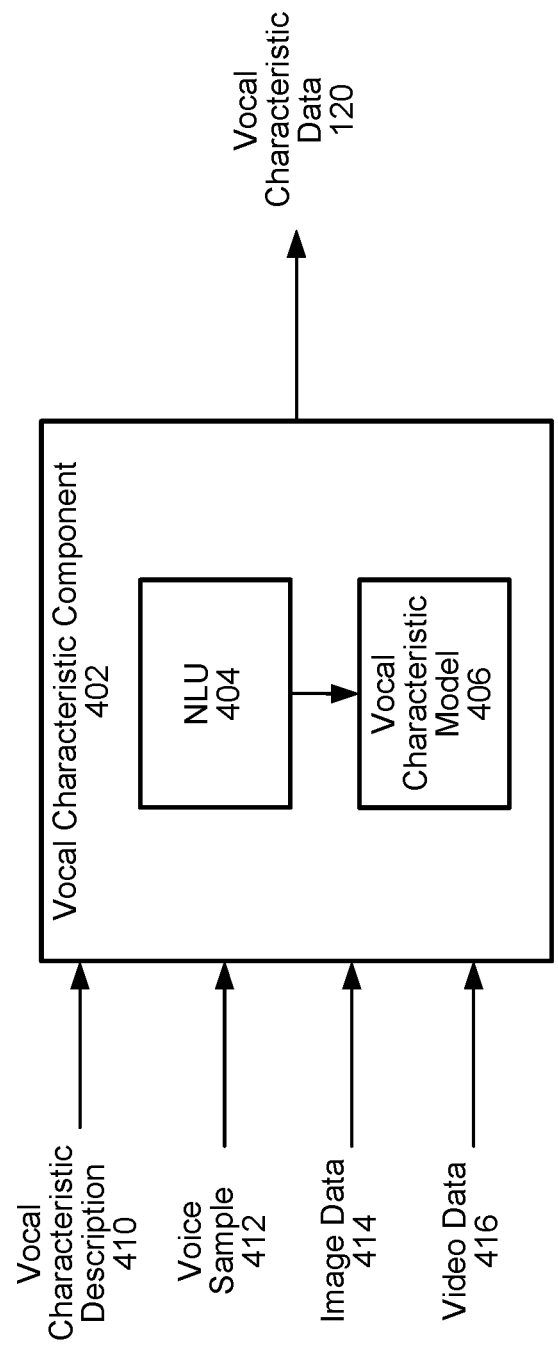
FIG. 4 illustrates components of a system for generating vocal characteristic data according to embodiments of the present disclosure.

FIG. 4 illustrates a vocal characteristic component 402, which may include a vocal characteristic model 406 for generating at least a portion of the vocal characteristic data 120 based on a received vocal characteristic description 410, (e.g., text data describing one or more vocal characteristics), a received voice sample 412 (e.g., a representation of speech exhibiting one or more vocal characteristics), image data 414 (e.g., data representing an image representing one or more vocal characteristics; e.g., an image of a pirate may represent pirate-style vocal characteristics), and/or video data 416 (e.g., data representing one or more vocal characteristics, such as a video of a person's lips as they speak or a video of a person moving). The vocal characteristic model 406 may process one or more of the data 410, 412, 414, 416 to determine data corresponding to one or more vocal characteristics, such as speech rate data, tone data, pitch data, prosody data, loudness data, etc., and may generate corresponding vocal characteristic data 120, which may include these properties and/or other properties, which may be called embeddings, derived from the determined properties but not necessarily corresponding to a particular vocal property. For example, if the pitch is above a threshold, an item of the vocal characteristic data 120 may be "female."

Figure 10:
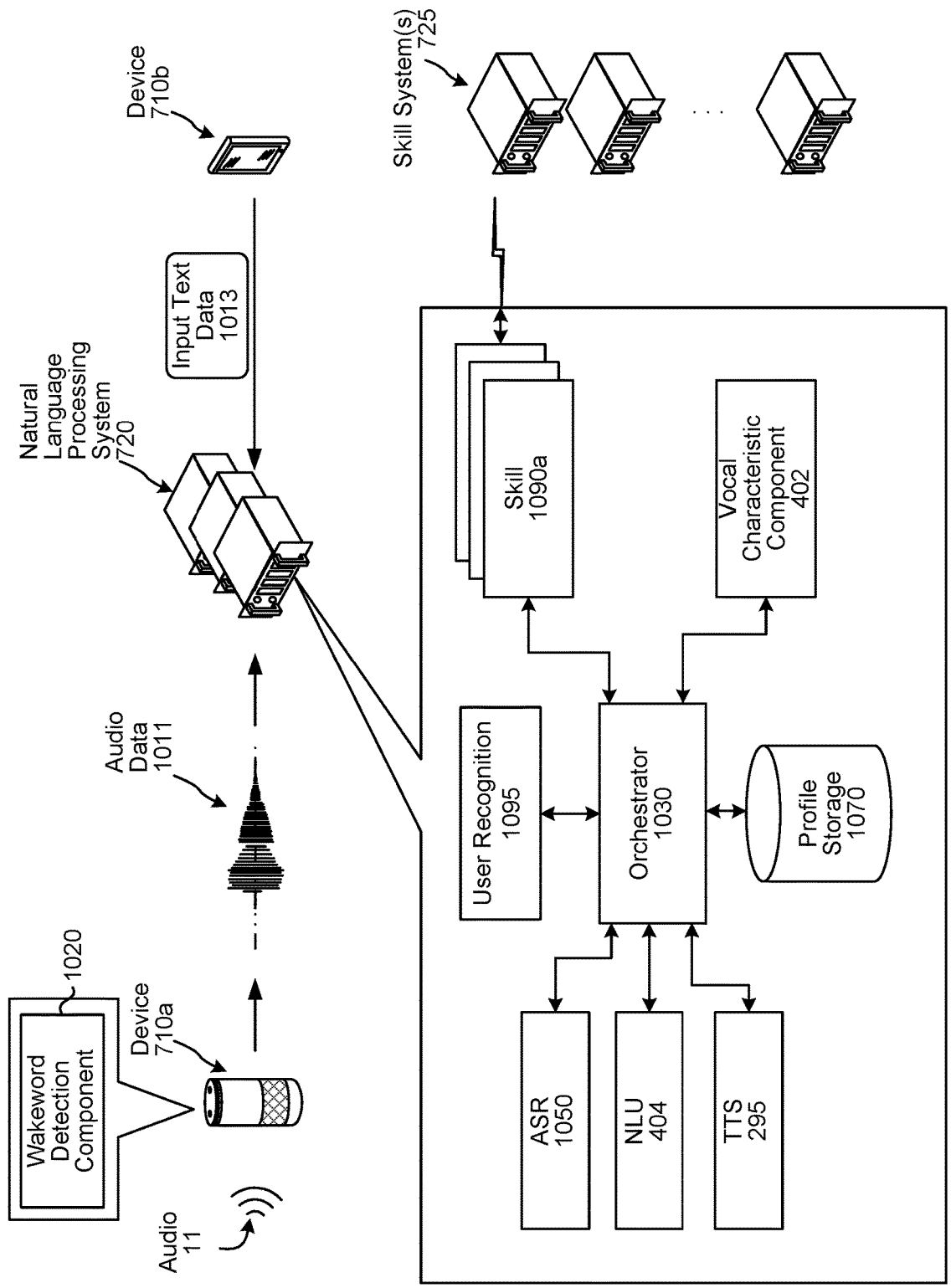
FIG. 10 is a conceptual diagram of components of a system, in accordance with embodiments of the present disclosure.

A natural-language understanding (NLU) component 404 may be used to process some or all of the input data 410, 412, 414 to assist the vocal characteristic model 406 in determining some or all of the vocal characteristic data 120. For example, if the vocal characteristic description 410 includes the phrase "sound like a professor," the NLU component 404 may determine that the vocal characteristic data 120 includes terms (or values representing the terms) "distinguished" and "received pronunciation accent." Similarly, the NLU component 404 may classify image data 414 as representing one or more entities, such as "professor" or "pirate." The NLU component 404 may be configured within a voice characteristic component 402 or may be separate from the voice characteristic component, for example as shown in FIG. 10.

The NLU component 404 may be one or more trained neural-network models, classifiers, or other such components. The NLU component may make a semantic interpretation of the phrase(s) or statement(s) represented in the vocal characteristic description 410, of the voice type represented by the voice sample 412, by an image depicted in the image data 414, and/or in a video depicted in the video data 416 by determining one or more meanings associated with one or more of the input data 410, 412, 414, and/or 416. For example, if the vocal characteristic description 410 corresponds to "sound like Elmo from Sesame Street," the NLU component 404 may determine an intent that the vocal characteristic description 410 sounds like that television character and that the vocal characteristic data 120 includes indications such as "childlike." The NLU results data may include an N-best list of NLU hypotheses. The vocal characteristic data 120 may thus include a number of top-ranking hypotheses.

The NLU component 404 may include one or more recognizers. Each recognizer may be associated with a different content source. The NLU component 404 may determine a hypothesis associated with a vocal characteristic potentially associated with the vocal characteristic description 410, voice sample 412, image data 414, and/or video data 416 in order to determine the proper recognizer to process the hypothesis. The NLU component 404 may determine a word or phrase represented in the vocal characteristic description 410 is potentially associated with more than one vocal characteristic.

The NLU component 404 may determine that the vocal characteristic description 410 contains insufficient detail to create the vocal characteristic data 120. The NLU component 404 may, in these circumstances, use default values for the vocal characteristic data 120. For example, if the NLU component 404 cannot determine if the vocal characteristic description 410 includes an indication of gender, the NLU component 404 may default to including an indication of a female voice in the vocal characteristic data 120. In other embodiments, a dialog model may cause request data to be sent to the user device 710; the request data may be output by the user device 710 and thus output a prompt for the further information. The dialog model may be, for example, a sequence-to-sequence neural network model trained using sample dialog data. The NLU component 404 may thus determine the vocal characteristic data 120 over multiple turns of dialog using the dialog model (e.g., it may process multiple items of vocal characteristic description 410). For example, if the NLU component 404 determines that a first turn of dialog does not include the sufficient detail, it may cause a second, third, etc., turn of dialog to occur.

Figure 5:
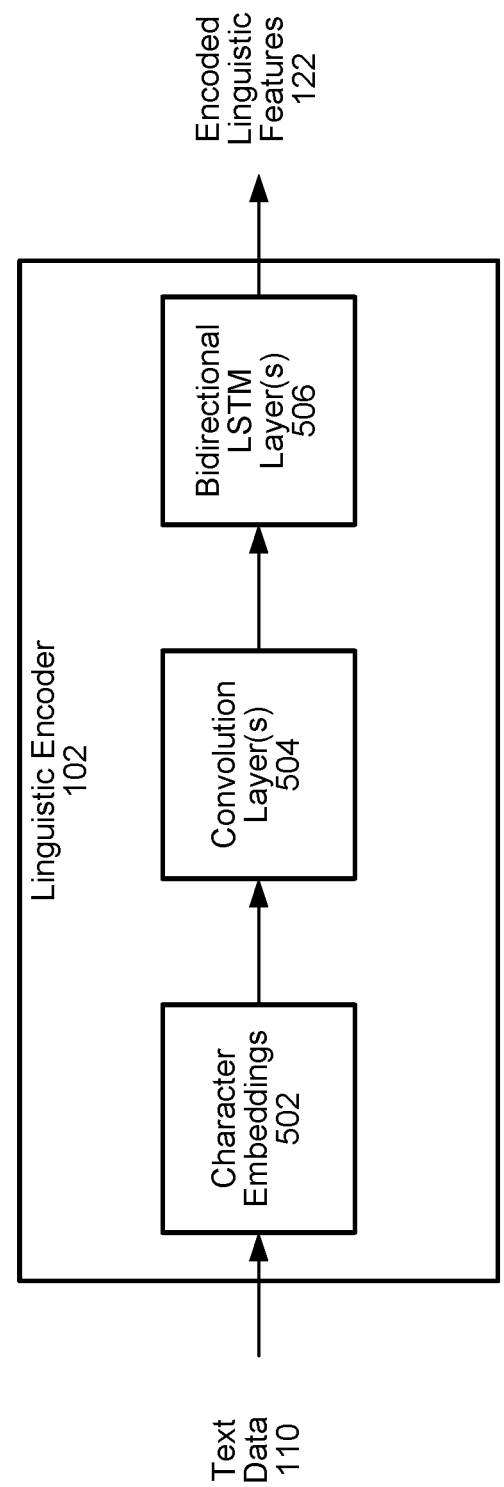
FIG. 5 illustrates components of an encoder according to embodiments of the present disclosure.

FIG. 5 illustrates one embodiment of one or more of the encoders 102, 104, 310; the present disclosure is not, however, limited to any particular embodiment of the encoders 102, 104, 310. The encoders 102, 104, 310 may receive input data, such as text data 110, and a character embeddings component 502 may create character embeddings based thereon. The character embeddings may represent the input text data 110 as a defined list of characters, which may include, for example, English characters (e.g., a-z and A-Z), numbers, punctuation, special characters, and/or unknown characters. The character embeddings may transform the list of characters into one or more corresponding vectors using, for example, one-hot encoding. The vectors may be multi-dimensional; in some embodiments, the vectors represent a learned 512-dimensional character embedding.

The character embeddings may be processed by one or more convolution layer(s) 504, which may apply one or more convolution operations to the vectors corresponding to the character embeddings. In some embodiments, the convolution layer(s) 504 correspond to three convolutional layers each containing 512 filters having shapes of 5×1, i.e., each filter spans five characters. The convolution layer(s) 504 may model longer-term context (e.g., N-grams) in the character embeddings. The final output of the convolution layer(s) 504 (i.e., the output of the only or final convolutional layer) may be passed to bidirectional LSTM layer(s) 506 to generate output data, such as encoded linguistic features 122. In some embodiments, the bidirectional LSTM layer 506 includes 512 units: 256 in a first direction and 256 in a second direction.

In some embodiments, the speech model 100 includes one or more attention network(s) that summarize the output(s) of one or more encoder(s) 102, 104, 310 as fixed-length context vectors corresponding to output step of the decoder 106. The attention network may be a RNN, DNN, or other network discussed herein, and may include nodes having weights and/or cost functions arranged into one or more layers. Attention probabilities may be computed after projecting inputs to (e.g.) 128-dimensional hidden representations. In some embodiments, the attention network weights certain values of the outputs of the encoders 102, 104, 310 before sending them to the decoder 106. The attention network may, for example, weight certain portions of the context vector by increasing their value and may weight other portions of the context vector by decreasing their value. The increased values may correspond to acoustic features to which more attention should be paid by the decoder 106 and the decreased values may correspond to acoustic feature to which less attention should be paid by the decoder 106.

Use of the attention network may permit the encoders 102, 104, 310 to avoid encoding their entire inputs into a fixed-length vector; instead, the attention network may allow the decoder 106 to "attend" to different parts of the encoded context data 124 at each step of output generation. The attention network may allow the encoder 102, 104, 310 and/or decoder 106 to learn what to attend to.

Figure 6:
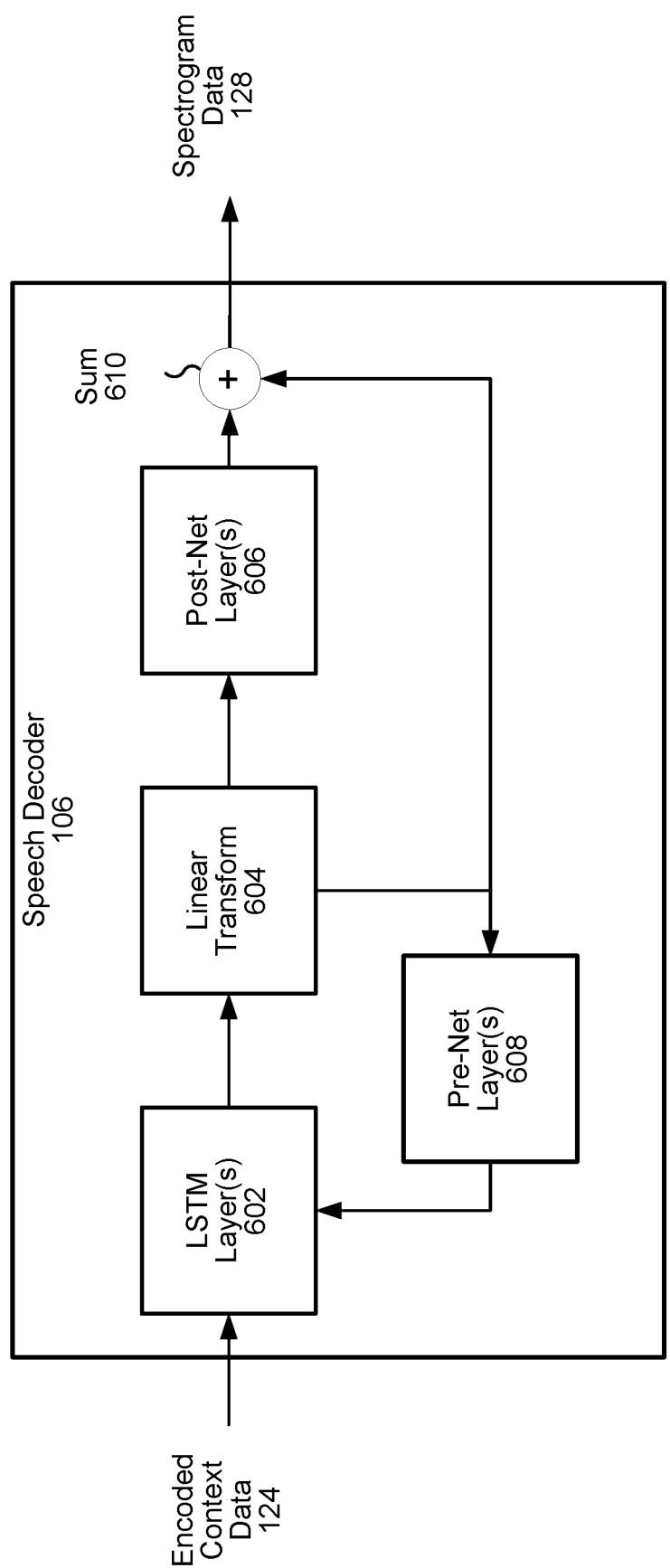
FIG. 6 illustrates components of a decoder according to embodiments of the present disclosure.

FIG. 6 illustrates one embodiment of one or more of the decoder 106; the present disclosure is not, however, limited to any particular embodiment of the decoder 106. The decoder 106 may be a network, such as a neural network; in some embodiments, the decoder is an autoregressive recurrent neural network (RNN). The decoder 106 may generate the spectrogram data 128 from the encoded context data 124 one frame at a time. The spectrogram data 128 may represent a prediction of frequencies corresponding to the output audio data 290. For example, if the output audio data 290 corresponds to speech denoting a fearful emotion, the spectrogram data 128 may include a prediction of higher frequencies; if the output audio data 290 corresponds to speech denoting a whisper, the spectrogram data 128 may include a prediction of lower frequencies. In some embodiments, the spectrogram data 128 includes frequencies adjusted in accordance with a Mel scale, in which the spectrogram data 128 corresponds to a perceptual scale of pitches judged by listeners to be equal in distance from one another. In these embodiments, the spectrogram data 128 may include or be referred to as a Mel-frequency spectrogram and/or a Mel-frequency cepstrum (MFC).

The decoder 106 may include one or more pre-net layers 608. The pre-net layers 608 may include two fully connected layers of 256 hidden units, such as rectified linear units (ReLUs). The pre-net layers 608 receive spectrogram data 128 from a previous time-step and may act as information bottleneck, thereby aiding the attention network in focusing attention on particular outputs of the encoder 104. In some embodiments, use of the pre-net layer(s) 608 allows the decoder 106 to place a greater emphasis on the output of the attention network and less emphasis on the spectrogram data 128 from the previous time-temp.

The output of the pre-net layers 608 may be concatenated with the output of the attention network. One or more LSTM layer(s) 602 may receive this concatenated output. The LSTM layer(s) 602 may include two uni-directional LSTM layers, each having (e.g.) 1024 units. The output of the LSTM layer(s) 602 may be transformed with a linear transform 604, such as a linear projection. In other embodiments, a different transform, such as an affine transform, may be used. One or more post-net layer(s) 606, which may be convolution layers, may receive the output of the linear transform 604; in some embodiments, the post-net layer(s) 606 include five layers, and each layer includes (e.g.) 512 filters having shapes 5×1 with batch normalization; tanh activations may be performed on outputs of all but the final layer. A concatenation element 610 may concatenate the output of the post-net layer(s) 606 with the output of the linear transform 604 to generate the spectrogram data 606.

Figure 7:
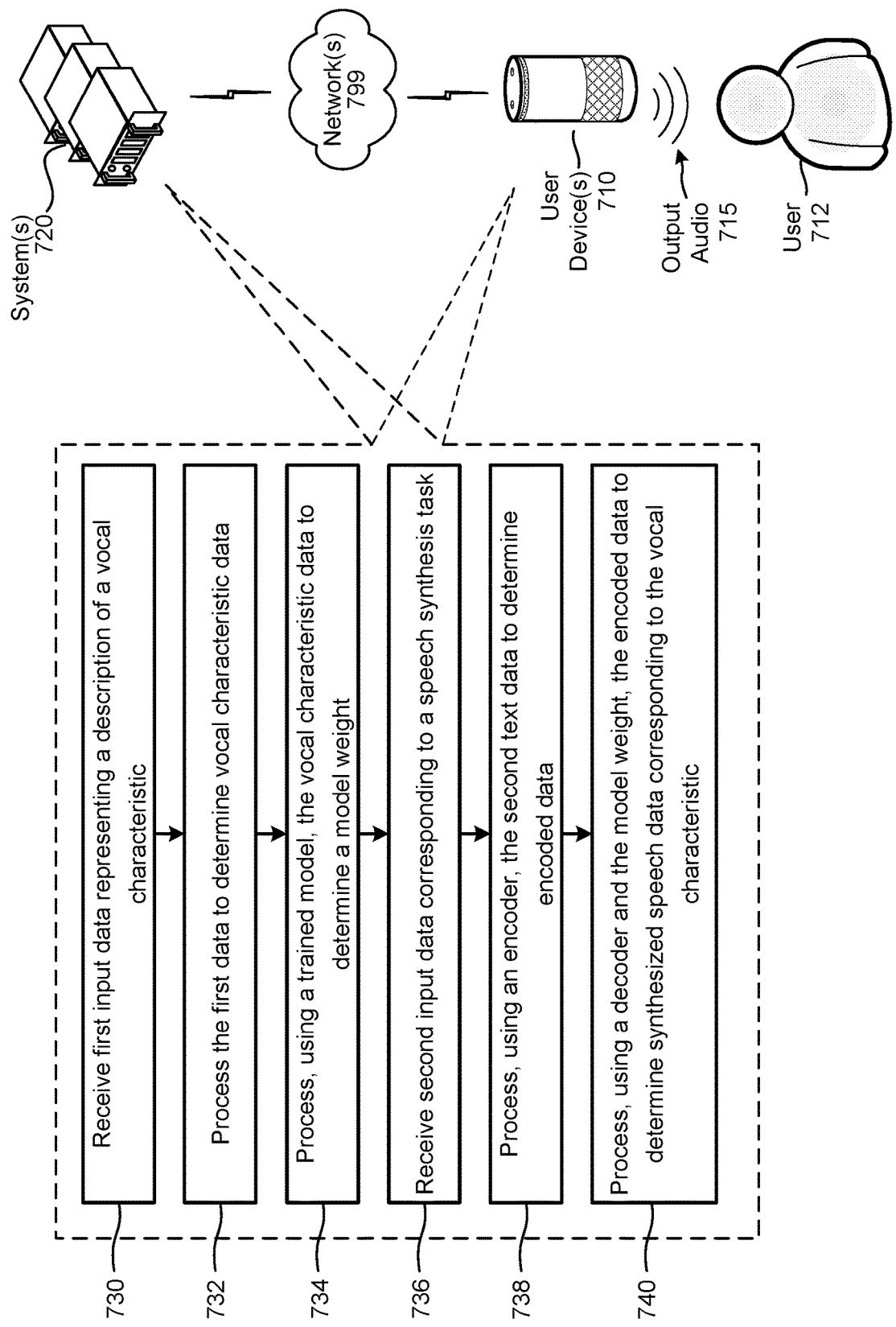
FIG. 7 illustrates a system and method for performing TTS processing according to embodiments of the present disclosure.

As shown in FIG. 7, one or more system(s) 720 may be connected over a network 799 to one or more user device(s) 710 that are proximate to a user 712. The user device 710 and/or system(s) 720 may be one physical machine capable of performing various operations described herein or may include several different machines, such as in a distributed computing environment, that combine to perform the operations described herein. Thus, in some embodiments, the user device 710 may receive input data and send that data to the system(s) 720 for processing; in other embodiments, the user device 710 performs some or all of the processing. The system(s) 720 and/or user device(s) 710 may produce output audio 715 in accordance with the embodiments described herein. The user device 710 and/or system(s) 720 receive (730) first input data representing a description of a vocal characteristic. The user device 710 and/or system(s) 720 process (732) the first text data to determine vocal characteristic data. The user device 710 and/or system(s) 720 process (734), using a trained model, the vocal characteristic data to determine a model weight. The user device 710 and/or system(s) 720 receive (736) second input data. The user device 710 and/or system(s) 720 process (738), using an encoder, the second text data to determine encoded data. The user device 710 and/or system(s) 720 process (740), using a decoder and the model weight, the encoded data to determine synthesized speech data corresponding to the vocal characteristic.

Figure 8:
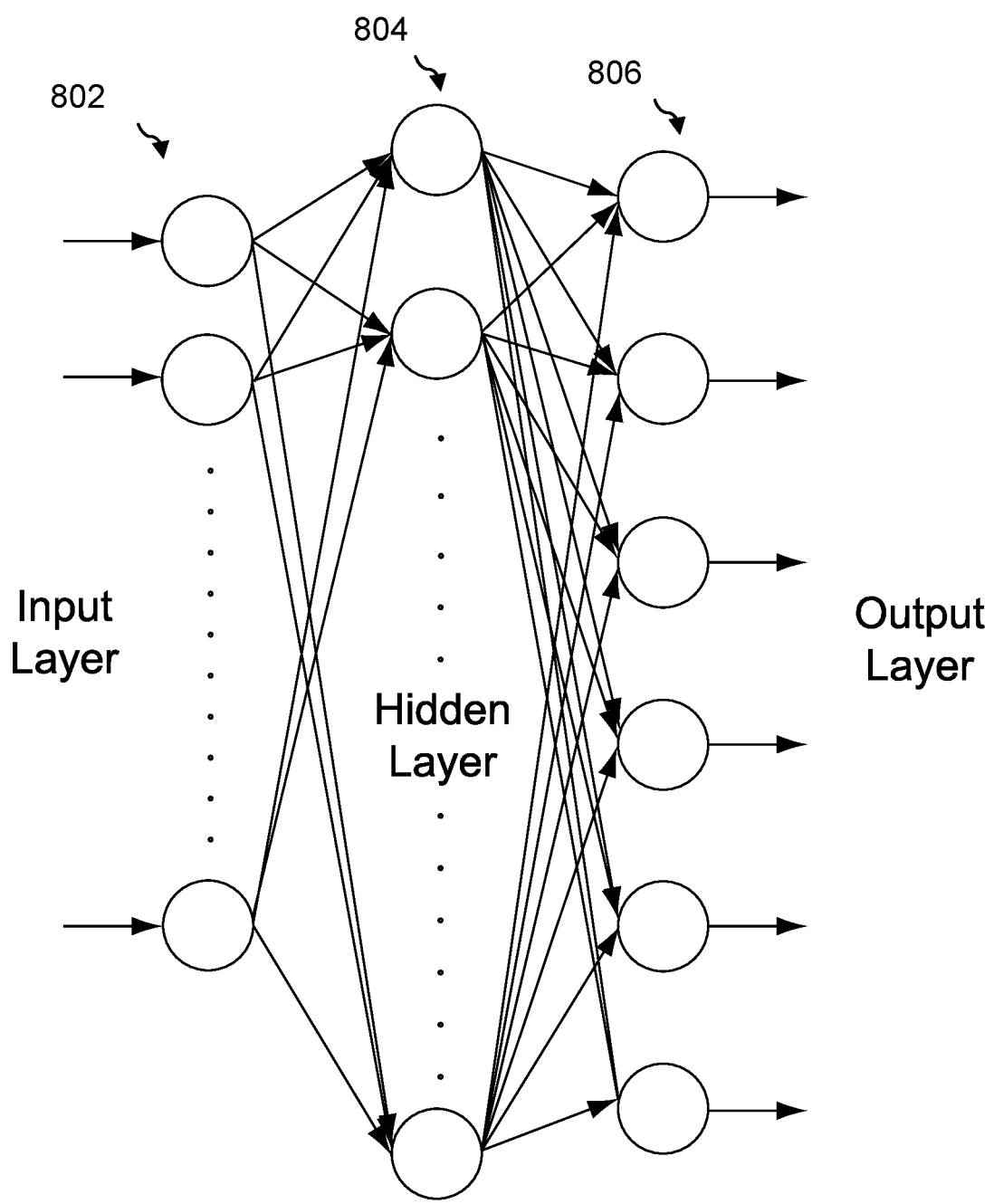
FIG. 8 illustrates a feedforward neural network for TTS processing according to embodiments of the present disclosure.

As described herein, neural networks may be used to perform TTS processing using the vocal characteristic data 120. An example neural network for TTS is illustrated in FIG. 8. This neural network may be or include the encoders 102, 104, 310, decoder 106, or other components described herein. The neural network may include an input layer 802, hidden layer(s) 804, and an output layer 806. Each node of the hidden layer(s) 804 may be connected to each node in the input layer and each node in the output layer. Although illustrated in FIG. 8 with a single hidden layer, the neural network may include multiple hidden layers 804. In this case, each node in a hidden layer 804 may connect to each node in the next higher layer and next lower layer. Each node of the input layer 802 represents a potential input to the neural network and each node of the output layer represents a potential output of the neural network. Each connection from one node to another node in the next layer may be associated with a weight or score. A neural network may output a single output or a weighted set of possible outputs.

Figure 9:
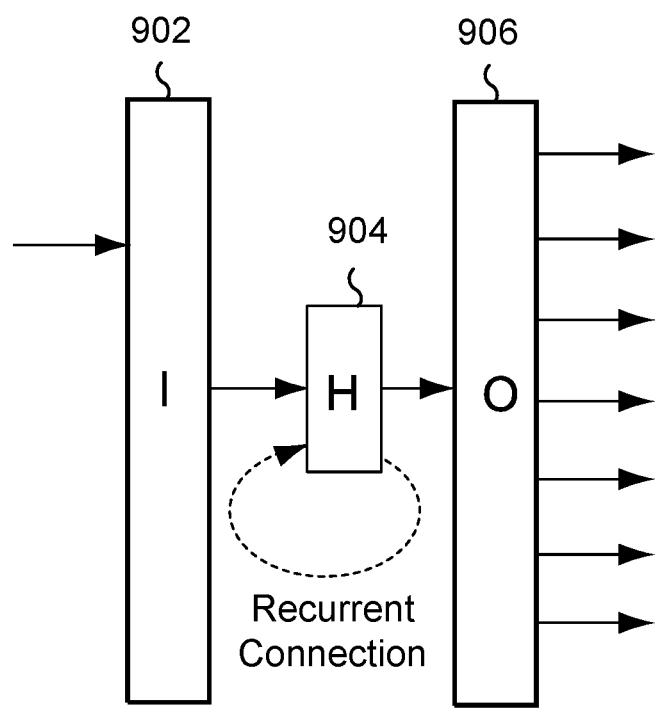
FIG. 9 illustrates a recurrent neural network for TTS processing according to embodiments of the present disclosure.

In one aspect, the encoders 102, 104, 310, decoder 106, or other components described herein may be constructed with recurrent connections such that the output of a hidden layer of the network feeds back into the hidden layer again for the next set of inputs. Such a neural network is illustrated in FIG. 9. Each node of an input layer 902 may be connected to each node of a hidden layer 904. Each node of a hidden layer 904 may be connected to each node of an output layer 906. As illustrated, the output of the hidden layer 904 is fed back into the hidden layer for processing of the next set of inputs. A neural network incorporating recurrent connections may be referred to as a recurrent neural network (RNN). Nodes of an RNN may be, for example, long short-term memory (LSTM) nodes or gated recurrent unit (GRU) nodes.

In the case where a TTS system uses one or more neural networks, each node of the neural network input layer may represent an acoustic feature of an audio feature vector of acoustic features, such as those that may be output after the first pass of performing TSS, and each node of the output layer represents a score corresponding to an acoustic unit (such as a phoneme, triphone, etc.) and/or associated states that may correspond to the sound represented by the audio feature vector. For a given input to the neural network, it may output a number of potential outputs each with an assigned score representing a probability that the particular output is the correct output given the particular input. Each node of the output layer may represent a potential next part of synthesized speech as determined by the neural network model. A recurrent neural network may incorporate some history of words processed by the neural network, such as the network illustrated in FIG. 9; the prediction of the potential part of synthesized speech may be based on previous input(s). The neural network may also output weighted predictions for the next potential part of synthesized speech.

Processing by a neural network is determined by the learned weights on each node input and the structure of the network. Given a particular input, the neural network determines the output one layer at a time until the output layer of the entire network is calculated. Connection weights may be initially learned by the neural network during training, where given inputs are associated with known outputs. In a set of training data, a variety of training examples are fed into the network. Each example typically sets the weights of the correct connections from input to output to 1 and gives all incorrect connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with a lattice to improve speech synthesis when the entire lattice is processed.

Further details of the system configured to perform text-to-speech processing using input voice characteristic data are explained below, following a discussion of the overall system of FIG. 10. The various components may be located on same or different physical devices. Communication between various components may occur directly or across a network(s) 799.

As shown in FIG. 10, an audio capture component(s), such as a microphone or array of microphones of the device 710a, captures audio 11. The device 710a processes audio data, representing the audio 11, to determine whether speech is detected. The device 710a may use various techniques to determine whether audio data includes speech. In some examples, the device 710a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 710a may implement a limited classifier configured to distinguish speech from background noise. The classifier may be implemented by techniques such as linear classifiers, support vector machines, and decision trees. In still other examples, the device 710a may apply Hidden Markov Model (HMM) or Gaussian Mixture Model (GMM) techniques to compare the audio data to one or more acoustic models in storage. Such acoustic models may include models corresponding to speech, noise (e.g., environmental noise or background noise), or silence. Still other techniques may be used to determine whether speech is present in audio data.

Once speech is detected in audio data representing the audio 11, the device 710a may use a wakeword detection component 1020 to perform wakeword detection to determine when a user intends to speak an input to the natural language processing system 720. An example wakeword is "Alexa." As used herein, a "wakeword" may refer to a single word or more than one consecutive words in speech.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 1020 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1020 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 710a may "wake" and begin transmitting audio data 1011, representing the audio 11, to the natural language processing system 720. The audio data 1011 may include data corresponding to the wakeword, or the device 710a may remove the portion of the audio corresponding to the wakeword prior to sending the audio data 1011 to the natural language processing system 720.

An orchestrator component 1030 may receive the audio data 1011. The orchestrator component 1030 may include memory and logic that enables the orchestrator component 1030 to transmit various pieces and forms of data to various components of the system 100, as well as perform other operations.

The orchestrator component 1030 may send the audio data 1011 to an ASR component 1050. The ASR component 1050 transcribes the audio data 1011 into text data. The text data output by the ASR component 1050 represents one or more than one (e.g., in the form of an n-best list) ASR hypotheses representing speech represented in the audio data 1011. The ASR component 1050 interprets the speech in the audio data 1011 based on a similarity between the audio data 1011 and pre-established language models. For example, the ASR component 1050 may compare the audio data 1011 with models for sounds (e.g., subword units, such as phonemes, etc.) and sequences of sounds to identify words that match the sequence of sounds of the speech represented in the audio data 1011. The ASR component 1050 outputs text data representing one or more ASR hypotheses. The text data output by the ASR component 1050 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The device 710b may receive a text-based natural language user input. The device 710b may generate text data 1013 representing the text-based natural language user input. The device 710b may send the text data 1013 to the natural language processing system 720. The orchestrator component 1030 may receive the text data 1013.

The orchestrator component 1030 may send text data (e.g., text data output by the ASR component 1050 or the received text data 1013) to an NLU component 404.

The NLU component 404 attempts to make a semantic interpretation of the phrase(s) or statement(s) represented in the received text data. That is, the NLU component 404 determines one or more meanings associated with the phrase(s) or statement(s) represented in the text data based on words represented in the text data. The NLU component 404 determines an intent representing an action that a user desires be performed as well as pieces of the text data that allow a device (e.g., the device 710, the natural language processing system 720, a skill 1090, a skill system 725, etc.) to execute the intent. For example, if the text data corresponds to "play Adele music," the NLU component 404 may determine an intent that the natural language processing system 720 output music and may identify "Adele" as an artist. For further example, if the text data corresponds to "what is the weather," the NLU component 404 may determine an intent that the natural language processing system 720 output weather information associated with a geographic location of the device 710. In another example, if the text data corresponds to "turn off the lights," the NLU component 404 may determine an intent that the natural language processing system 720 turn off lights associated with the device(s) 710 or the user(s) 712. The NLU component 404 may output NLU results data (which may include tagged text data, indicators of intent, etc.).

As described above, the natural language processing system 720 may perform speech processing using two different components (e.g., the ASR component 1050 and the NLU component 404). One skilled in the art will appreciate that the natural language processing system 720, in at least some examples, may implement a spoken language understanding (SLU) component that is configured to process the audio data 1011 to generate NLU results data.

In some examples, the SLU component may be equivalent to the ASR component 1050 and the NLU component 404. For example, the SLU component may process the audio data 1011 and generate NLU data. The NLU results data may include intent data and/or slot data. While the SLU component may be equivalent to a combination of the ASR component 1050 and the NLU component 404, the SLU component may process audio data 1011 and directly generate the NLU results data, without an intermediate step of generating text data (as does the ASR component 1050). As such, the SLU component may take the audio data 1011 representing natural language speech and attempt to make a semantic interpretation of the natural language speech. That is, the SLU component may determine a meaning associated with the natural language speech and then implement that meaning. For example, the SLU component may interpret the audio data 1011 representing natural language speech from the user 712 in order to derive an intent or a desired action or operation from the user 712. In some examples, the SLU component outputs a most likely NLU hypothesis recognized in the audio data 1011, or multiple NLU hypotheses in the form of a lattice or an N-best list with individual hypotheses corresponding to confidence scores or other scores (such as probability scores, etc.).

The natural language processing system 720 may include one or more skills 1090. A "skill" may be software running on the natural language processing system 720 that is akin to a software application running on a traditional computing device. That is, a skill 1090 may enable the natural language processing system 720 to execute specific functionality in order to provide data or produce some other requested output. The natural language processing system 720 may be configured with more than one skill 1090. For example, a weather service skill may enable the natural language processing system 720 to provide weather information, a car service skill may enable the natural language processing system 720 to book a trip with respect to a taxi or ride sharing service, a restaurant skill may enable the natural language processing system 720 to order a pizza with respect to the restaurant's online ordering system, etc. A skill 1090 may operate in conjunction between the natural language processing system 720 and other devices, such as the device 710, in order to complete certain functions. Inputs to a skill 1090 may come from speech processing interactions or through other interactions or input sources. A skill 1090 may include hardware, software, firmware, or the like that may be dedicated to a particular skill 1090 or shared among different skills 1090.

Additionally or alternatively to being implemented by the natural language processing system 720, a skill 1090 may be implemented by a skill system 725. Such may enable a skill system 725 to execute specific functionality in order to provide data or perform some other action requested by a user.

Skills may be associated with different domains, such as smart home, music, video, flash briefing, shopping, and custom (e.g., skills not associated with any pre-configured domain).

The natural language processing system 720 may be configured with a single skill 1090 dedicated to interacting with more than one skill system 725.

Unless expressly stated otherwise, reference herein to a "skill" may include a skill 1090 operated by the natural language processing system 720 and/or skill operated by a skill system 725. Moreover, the functionality described herein as a skill may be referred to using many different terms, such as an action, bot, app, or the like.

The natural language processing system 720 may include a TTS component 295. The TTS component 295 may generate audio data (e.g., synthesized speech) from text data using one or more different methods. Text data input to the TTS component 295 may come from a skill 1090, a skill system 725, the orchestrator component 1030, or another component of the natural language processing system 720.

In one method of synthesis called unit selection, the TTS component 295 matches text data against a database of recorded speech. The TTS component 295 selects matching units of recorded speech and concatenates the units together to form audio data. In another method of synthesis called parametric synthesis, the TTS component 295 varies parameters such as frequency, volume, and noise to create audio data including an artificial speech waveform. Parametric synthesis uses a computerized voice generator, sometimes called a vocoder.

The natural language processing system 720 may include a user recognition component 1095 that recognizes one or more users associated with data input to the natural language processing system 720. The user recognition component 1095 may take as input the audio data 1011 and/or the text data 1013. The user recognition component 1095 may perform user recognition by comparing speech characteristics in the audio data 1011 to stored speech characteristics of users. The user recognition component 1095 may additionally or alternatively perform user recognition by comparing biometric data (e.g., fingerprint data, iris data, etc.), received by the natural language processing system 720 in correlation with a user input, to stored biometric data of users. The user recognition component 1095 may additionally or alternatively perform user recognition by comparing image data (e.g., including a representation of at least a feature of a user), received by the natural language processing system 720 in correlation with a user input, with stored image data including representations of features of different users. The user recognition component 1095 may perform other or additional user recognition processes, including those known in the art. For a particular user input, the user recognition component 1095 may perform processing with respect to stored data of users associated with the device 710 that captured the natural language user input.

The user recognition component 1095 determines whether a user input originated from a particular user. For example, the user recognition component 1095 may generate a first value representing a likelihood that a user input originated from a first user, a second value representing a likelihood that the user input originated from a second user, etc. The user recognition component 1095 may also determine an overall confidence regarding the accuracy of user recognition operations.

The user recognition component 1095 may output a single user identifier corresponding to the most likely user that originated the natural language user input. Alternatively, the user recognition component 1095 may output multiple user identifiers (e.g., in the form of an N-best list) with respective values representing likelihoods of respective users originating the natural language user input. The output of the user recognition component 1095 may be used to inform NLU processing, processing performed by a skill 1090, as well as processing performed by other components of the natural language processing system 720 and/or other systems.

The natural language processing system 720 may include profile storage 1070. The profile storage 1070 may include a variety of information related to individual users, groups of users, devices, etc. that interact with the natural language processing system 720. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 1070 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the natural language processing system 720 with permission to allow the skill to execute with respect to the user's inputs. If a user does not enable a skill, the natural language processing system 720 may not permit the skill to execute with respect to the user's inputs.

The profile storage 1070 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 1070 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The device 710 and/or server 720 may include a vocal characteristic component 402, which may be a separate component or may be included in an ASR module 250. The vocal characteristic component 402 receives audio data and potentially non-audio data and classifies an utterance included in the audio according to detected qualities of the audio as described above. As described above, the vocal characteristic component 402 may employ classifier(s) or other machine learning trained models to determine qualities associated with an utterance.

A device 710 may receive a natural language user input. The natural language user input may be a spoken natural language user input or a text-based natural language user input. If the natural language user input is a spoken natural language user input, the device 710 may send, to the orchestrator component 1030, audio data (such as audio data 1011) representing the spoken natural language user input. If the natural language user input is a text-based user input, the device 710 may send, to the orchestrator component 1030, text data (such as input text data 1013) representing the text-based natural language user input.

If the orchestrator component 1030 receives audio data representing a spoken natural language user input, the orchestrator component 1030 may cause the ASR component 1050 to generate text data representing the spoken natural language user input in the audio data. The orchestrator component 1030 may send, to the NLU component 404, text data (either received as input text data 1013 or as generated by the ASR component 1050) representing the natural language user input.

The NLU component 404 may perform NLU processing on the text data to generate NLU results data. Part of this NLU processing may include entity resolution processing, whereby an entity, represented in the text data, is processed to correspond to an entity known to the natural language processing system 720. In at least some examples, the natural language processing system 720 may include one or more entity resolution services, which may be implemented separately from the NLU component 404. In at least some examples, each entity resolution service may correspond to a different domain. In such examples, the NLU component 404 may determine a domain to which the natural language user input most likely corresponds, and may provide NLU results data (which may include a tagged and slotted representation of a user input) to an entity resolution service corresponding to the domain. The entity resolution service may resolve one or more tagged entities represented in the text data sent to the entity resolution service. Thereafter, the entity resolution service may send, to the NLU component 404, data representing the resolved entities. The NLU component 404 may incorporate the received text data into NLU results data representing the natural language user input. The NLU component 404 may send the NLU results data to the orchestrator component 1030 for further processing, for example for sending to an appropriate skill 1090 and/or skill system 725.

The orchestrator component 1030 may determine a profile identifier corresponding to the natural language user input. In at least some examples, the orchestrator component 1030 may receive a user identifier(s) from the user recognition component 1095, and may determine a profile identifier associated with the user identifier (or top scoring user identifier if more than one user identifier is received from the user recognition component 1095). The orchestrator component 1030 may send, to the appropriate skill 1090 or other downstream component, data representing the profile identifier, the NLU results data (or a portion thereof, such a portion representing a domain to which the natural language user input corresponds), and an instruction to provide skill identifiers that are associated with the profile identifier and that correspond to the NLU results data (or portion thereof).

The orchestrator component 1030 may determine a profile identifier corresponding to the natural language user input. In at least some examples, the orchestrator component 1030 may receive a user identifier(s) from the user recognition component 1095, and may determine a profile identifier associated with the user identifier (or top scoring user identifier if more than one user identifier is received from the user recognition component 1095). The orchestrator component 1030 may send, to the appropriate skill 1090 or other downstream component, data representing the profile identifier, the NLU results data (or a portion thereof, such a portion representing an a domain to which the natural language user input corresponds), and an instruction to provide skill identifiers that are associated with the profile identifier and that correspond to the NLU results data (or portion thereof).

Using the NLU results data the orchestrator component 1030 may select a skill identifier corresponding to a skill 1090 to be invoked with respect to the natural language user input. The orchestrator component 1030 may send, to the skill 1090 corresponding to the selected skill identifier, data representing at least a portion of the NLU results data as well as other data that may be used in performing the requested operation, for example data from vocal characteristic component 402. The skill 1090 may then perform processing based on the received at least a portion of the NLU results data and/or other data.

The appropriate skill 1090/725 may then perform operations in accordance with the NLU data and may return data to the orchestrator 1030 for eventual output. The returned data may include text data 110 that may be sent by the orchestrator 1030 to the TTS component 295 for speech synthesis.

For example, a user may speak an utterance command such as "Alexa, read the Gettysburg Address like Celebrity A." The device 710*a*, through wakeword detection component 1020, may detect the wakeword "Alexa" and may begin sending input audio data 1011 corresponding to the utterance to system 720. The system may send the input audio data 1011 to ASR component 1050 (as well as potentially to vocal characteristic component 402). The ASR component may create input text data from the input audio data 1011. The input text data may then be sent to NLU 404 which may determine that the input text data corresponded to a command of <readtext> operating on <text:GettysburgAddress> with a modifier of <voice:CelebrityA>. The NLU 404, orchestrator 1030, or other component may then identify a skill 1090 corresponding to the request, for example a skill 1090 that coordinates synthesized speech using TTS 295. The skill 1090 may identify a location of the text of the Gettysburg Address and return it to the orchestrator 1030. The orchestrator may then send the text of the Gettysburg Address along with an indicator of the desired voice (e.g., <voice:CelebrityA>) to the TTS component 295. The text of the Gettysburg Address may serve as text data 110 input to the TTS component 295 while the indication of the desired voice may serve as context data 215 and/or vocal characteristic data 120. The TTS component 295 (for example using components described above) may identify voice data, models, etc. corresponding to the desired voice (e.g., <voice:CelebrityA>) and may then begin to create output audio data 290 corresponding to synthesized speech of the voice of Celebrity A reading the Gettysburg Address. The output audio data 290 may then be returned to the device 710a, as requested by the user.

In another example, a user may speak an utterance command such as "Alexa, read the Gettysburg Address like I am speaking right now" where the user's voice has some special characteristic like nasally, with an accent, imitating a celebrity, or the like. The device 710a, through wakeword detection component 1020, may detect the wakeword "Alexa" and may begin sending input audio data 1011 corresponding to the utterance to system 720. The system may send the input audio data 1011 to ASR component 1050 (as well as potentially to vocal characteristic component 402). The ASR component may create input text data from the input audio data 1011. The input text data may then be sent to NLU 404 which may determine that the input text data corresponded to a command of <readtext> operating on <text:GettysburgAddress> with a modifier of <voice:matchinput>. The NLU 404, orchestrator 1030, or other component may then identify a skill 1090 corresponding to the request, for example a skill 1090 that coordinates synthesized speech using TTS 295. The skill 1090 may identify a location of the text of the Gettysburg Address and return it to the orchestrator 1030. The orchestrator may then send the text of the Gettysburg Address along with an indicator of the desired voice (e.g., <voice:CelebrityA>) to the TTS component 295. The vocal characteristic component 402 may receive the audio data 1011 as the voice sample 412 as well as other data that may be relevant to creating the synthesized speech (for example, image data 414 and/or video data 416 of the user speaking the utterance, or other data (such as vocal characteristic description data 410). The vocal characteristic component 402 may then operate on that input to determine vocal characteristic data 120 indicating the speech characteristics of the user when speaking the utterance. The text of the Gettysburg Address may serve as text data 110 input to the TTS component 295 along with the determined vocal characteristic data 120 and/or vocal context data 215. The TTS component 295 (for example using components described above) may identify voice data, models, etc. corresponding to the desired voice (e.g., a voice matching the vocal characteristic data 120 as determined by the vocal characteristic component 402) and may then begin to create output audio data 290 corresponding to synthesized speech matching the style of the user's request reading the Gettysburg Address. The output audio data 290 may then be returned to the device 710a, as requested by the user.

Figure 11:
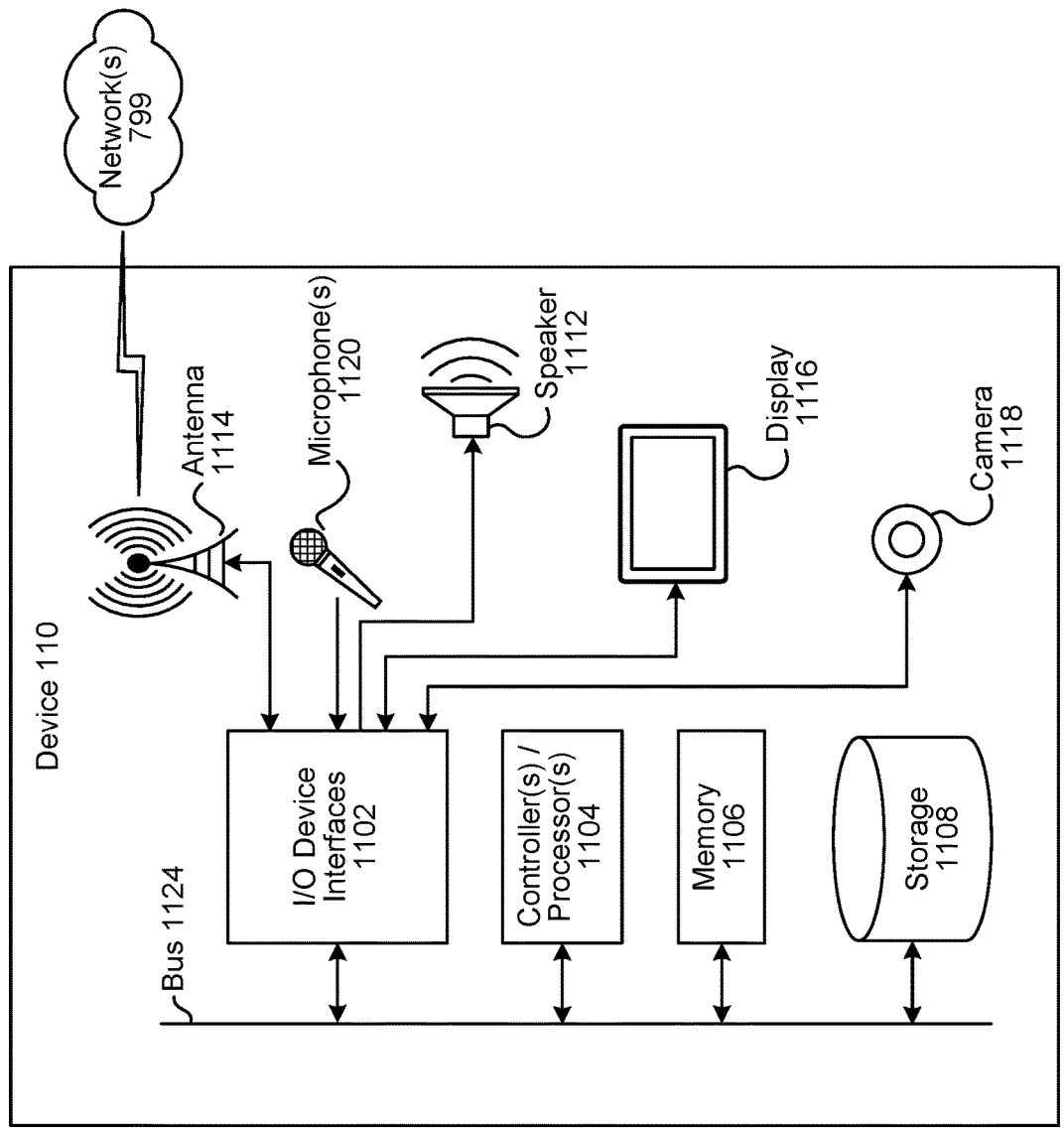
FIG. 11 illustrates components of a user device for TTS processing according to embodiments of the present disclosure.
Figure 12:
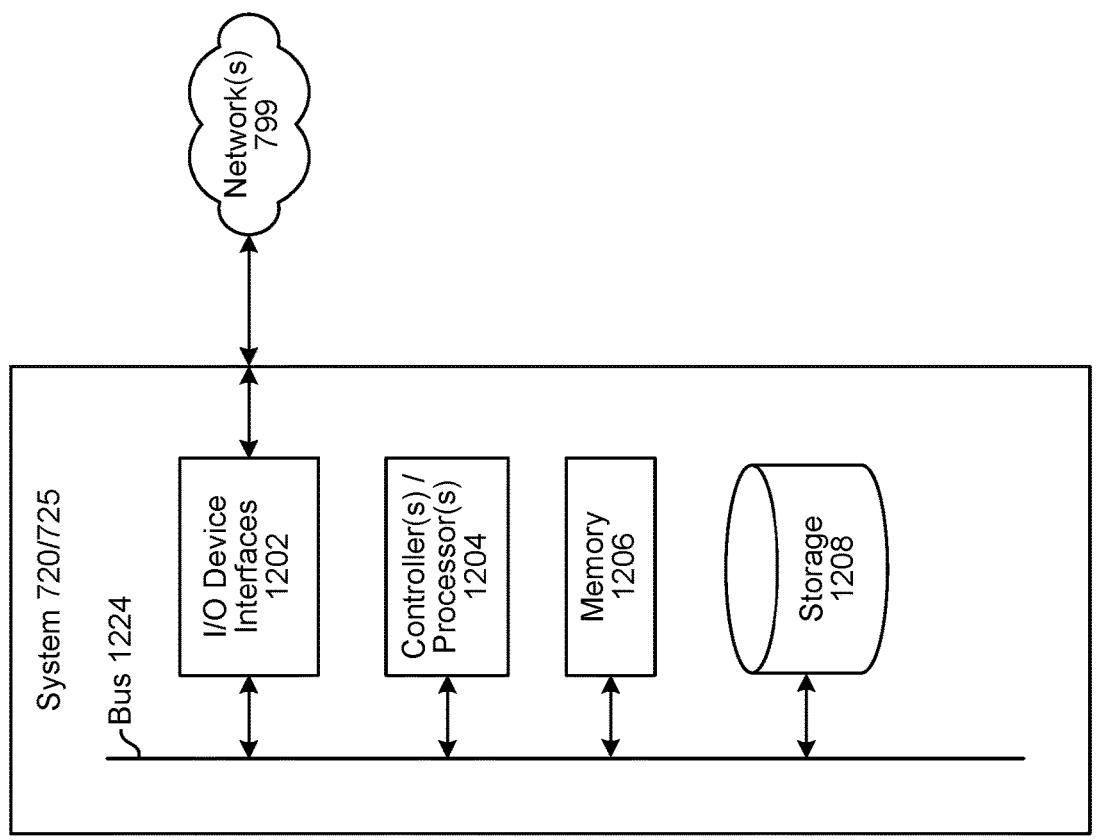
FIG. 12 illustrates components of a system for TTS processing according to embodiments of the present disclosure.

FIG. 11 is a block diagram conceptually illustrating a device 710 that may be used with the system. FIG. 12 is a block diagram conceptually illustrating example components of the system 720, which may be one or more servers and which may assist with TTS processing, NLU processing, etc. The term "system" as used herein may refer to a traditional system as understood in a system/client computing structure but may also refer to a number of different computing components that may assist with the operations discussed herein. For example, a server may include one or more physical computing components (such as a rack system) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server may be configured to operate using one or more of a client-system model, a computer bureau model, grid computing techniques, fog computing techniques, mainframe techniques, utility computing techniques, a peer-to-peer model, sandbox techniques, or other computing techniques.

Multiple servers may be included in the system 720, such as one or more servers for performing TTS processing. In operation, each of these server (or groups of devices) may include computer-readable and computer-executable instructions that reside on the respective server, as will be discussed further below. Each of these devices/systems (710/720) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (710/720) may also include a data storage component (1108/1208) for storing data and controller/processor-executable instructions. Each data storage component (1108/1208) may individually include one or more non-volatile storage types such as magnetic storage, optical storage, solid-state storage, etc. Each device (710/720) may also be connected to removable or external non-volatile memory and/or storage (such as a removable memory card, memory key drive, networked storage, etc.) through respective input/output device interfaces (1102/1202). The device 710 may further include loudspeaker(s) 1112, microphone(s) 1120, display(s) 1116, and/or camera(s) 1118.

Computer instructions for operating each device/system (710/720) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device/system (710/720) includes input/output device interfaces (1102/1202). A variety of components may be connected through the input/output device interfaces (1102/1202), as will be discussed further below. Additionally, each device (710/720) may include an address/data bus (1124/1224) for conveying data among components of the respective device. Each component within a device (710/720) may also be directly connected to other components in addition to (or instead of) being connected to other components across the bus (1124/1224).

Figure 13:
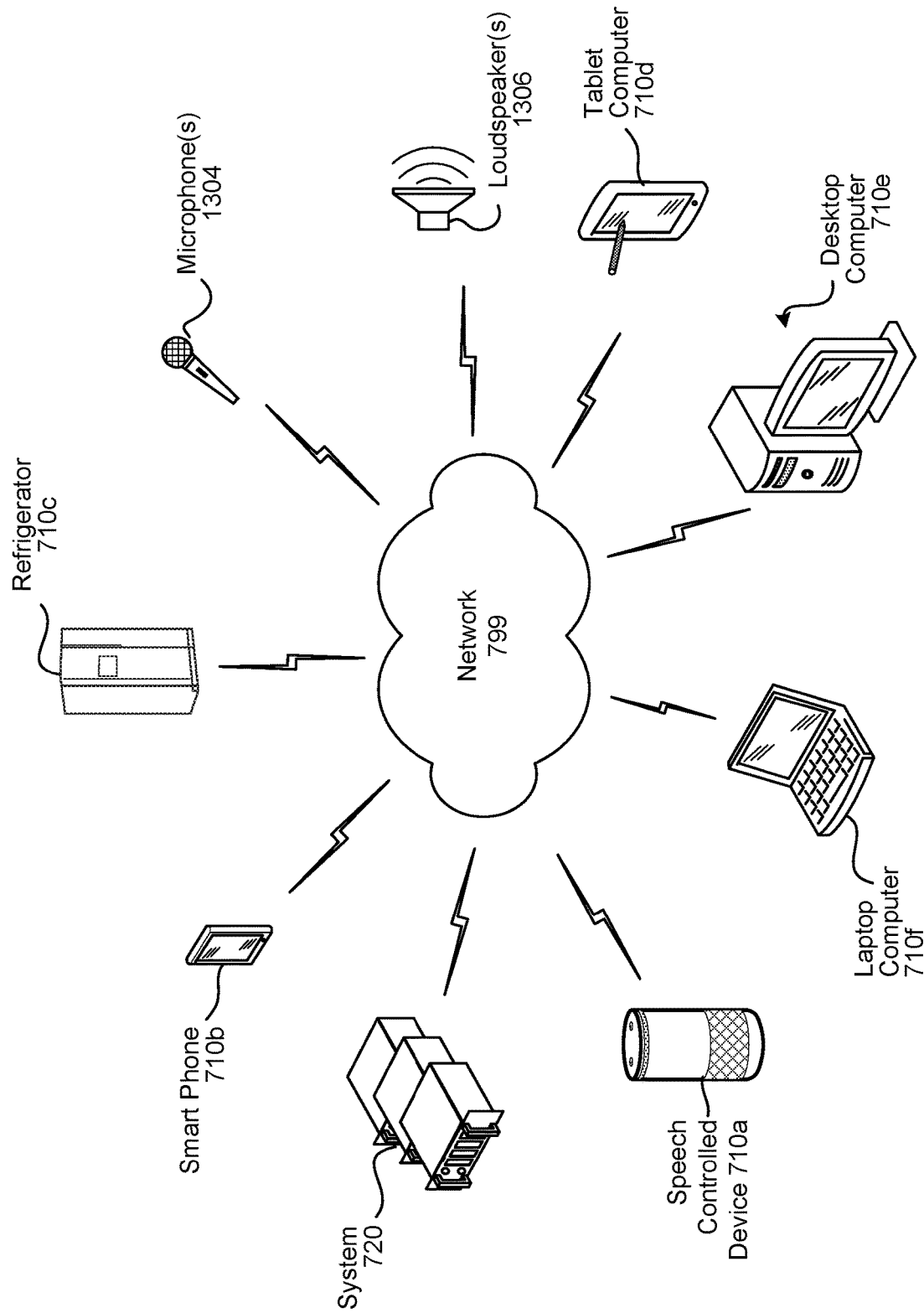
FIG. 13 illustrates a networked computing environment according to embodiments of the present disclosure.

Referring to FIG. 13, the device 710 may include input/output device interfaces 1102 that connect to a variety of components such as an audio output component (e.g., a loudspeaker 1306), a wired headset, or a wireless headset (not illustrated), or other component capable of outputting audio. The device 710 may also include an audio capture component. The audio capture component may be, for example, a microphone 1304 or array of microphones, a wired headset, or a wireless headset, etc. If an array of microphones is included, approximate distance to a sound's point of origin may be determined by acoustic localization based on time and amplitude differences between sounds captured by different microphones of the array. The device 710 may additionally include a display for displaying content. The device 710 may further include a camera.

Via antenna(s) 1114, the input/output device interfaces 1102 may connect to one or more networks 799 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 799, the system may be distributed across a networked environment. The I/O device interface (1102/1202) may also include communication components that allow data to be exchanged between devices such as different physical systems in a collection of systems or other components.

The components of the device(s) 710 and/or the system 720 may include their own dedicated processors, memory, and/or storage. Alternatively, one or more of the components of the device(s) 710 and/or the system 720 may utilize the I/O interfaces (1102/1202), processor(s) (1104/1204), memory (1106/1206), and/or storage (1108/1208) of the device(s) 710 and/or system 720. Thus, the TTS component 295 may have its own I/O interface(s), processor(s), memory, and/or storage.

As noted above, multiple devices may be employed in a single system. In such a multi-device system, each of the devices may include different components for performing different aspects of the system's processing. The multiple devices may include overlapping components. The components of the device 710 and/or the system 720, as described herein, are illustrative, and may be located as a stand-alone device or may be included, in whole or in part, as a component of a larger device or system.

The network 799 may further connect, a speech controlled device 710a, a tablet computer 710d, a smart phone 710b, a refrigerator 710c, a desktop computer 710e, and/or a laptop computer 710f through a wireless service provider, over a WiFi or cellular network connection, or the like. Other devices may be included as network-connected support devices, such as a system 720. The support devices may connect to the network 799 through a wired connection or wireless connection. Networked user decoder 106 devices 710 may capture audio using one-or-more built-in or connected microphones or audio-capture devices, with processing performed by the TTS or other components of the same device or another device connected via network 799. The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the components and engines may be implemented as in firmware or hardware, such as the acoustic front end, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for generating speech from text, the method comprising:
    receiving a request to generate output speech data corresponding to input text data, the request including a description of a speaking style;
    determining, using a natural-language understanding (NLU) component, that the input text data represents an intent to perform synthesis of speech using a description of a speaking style indicated in the input text data;
    determining the description corresponds to a vocal characteristic;
    determining vocal characteristic data representing at least the vocal characteristic;
    processing, using a voice decoder, the vocal characteristic data to determine a neural-network model weight;
    processing, using a first encoder, the input text data to determine encoded linguistic data;
    receiving second user input corresponding to a speech synthesis task;
    processing, using a second encoder, the second user input to determine encoded data, wherein determining the encoded data comprises processing, using the second encoder, the encoded linguistic data and the vocal characteristic data;
    processing, using a speech decoder and the neural-network model weight, the encoded data to determine synthesized speech data; and
    causing output of audio corresponding to the synthesized speech data.

2. The computer-implemented method of claim 1, further comprising:
    receiving audio data representing an utterance;
    processing the audio data to determine prosody data; and
    processing the prosody data using a trained model to determine a portion of the vocal characteristic data.

3. The computer-implemented method of claim 1, further comprising:
    processing, using a third encoder, the vocal characteristic data to determine encoded paralinguistic data,
    wherein determining the encoded data further comprises processing, using the second encoder, the encoded paralinguistic data.

4. The computer-implemented method of claim 1, wherein the request comprises a first portion and a second portion, further comprising:
    determining that the first portion lacks the description of the vocal characteristic;
    determining, using a dialog model, audio data representing a prompt for the vocal characteristic; and
    causing the audio data to be outputted.

5. A computer-implemented method comprising:
receiving first input data representing a vocal characteristic and a request to output content corresponding to the vocal characteristic;
performing natural language understanding (NLU) processing using the first input data to determine an intent to perform speech synthesis corresponding to the vocal characteristic represented in a portion of the first input data;
based at least in part on determining the intent to perform speech synthesis corresponding to the vocal characteristic represented in the portion of the first input data, processing the first input data to determine vocal characteristic data representing at least the vocal characteristic;
determining, using a trained model and the vocal characteristic data, a model output data;
receiving second input data corresponding to a speech synthesis task;
determining, using an encoder and the second input data, encoded data; and
determining, using a decoder, the model output data and the encoded data, synthesized speech data corresponding to the vocal characteristic.

6. The computer-implemented method of claim 5, wherein the first input data comprises audio data, and further comprising:
determining that the audio data represents an utterance;
processing the audio data to determine prosody data; and
processing the prosody data using a trained model to determine a portion of the vocal characteristic data.

7. The computer-implemented method of claim 5, further comprising:
prior to receiving the first input data, receiving third input data;
determining, using NLU processing, that the third input data lacks a description of the vocal characteristic; and
causing an indication of a request for the vocal characteristic to be sent to a local device.

8. The computer-implemented method of claim 5, wherein the encoder comprises a first encoder and a second encoder, further comprising:
determining, using the first encoder and the first input data, encoded linguistic data,
wherein determining the encoded data comprises processing, using the second encoder, the encoded linguistic data and the vocal characteristic data.

9. The computer-implemented method of claim 5 further comprising:
determining identification data indicating that the synthesized speech data includes a representation of synthesized speech;
determining modified synthesized speech data by processing the identification data with the synthesized speech data; and
sending the modified synthesized speech data.

10. The computer-implemented method of claim 5, wherein the first input data comprises a description of the vocal characteristic, and further comprising:
determining a second vocal characteristic different from the description,
wherein the vocal characteristic data further represents the second vocal characteristic.

11. The computer-implemented method of claim 5, wherein the encoder comprises a first encoder and a second encoder, further comprising:
determining, using the first encoder and the vocal characteristic data, encoded paralinguistic data,
wherein determining the encoded data comprises processing, using the second encoder, the encoded paralinguistic data and the vocal characteristic data.

12. The computer-implemented method of claim 5, wherein the portion of the first input data comprises audio data representing speech and the method further comprises:
determining that the intent indicates the vocal characteristic is to be determined to match a characteristic of the speech.

13. The computer-implemented method of claim 5, wherein the portion of the first input data comprises a description of the vocal characteristic and the method further comprises:
determining that the intent indicates the vocal characteristic is to be determined based at least in part on the description.

14. The computer-implemented method of claim 5, wherein the portion of the first input data comprises image data associated with the vocal characteristic and the method further comprises:
determining that the intent indicates the vocal characteristic is to be determined based at least in part on the image data.

15. A system comprising:
at least one processor; and
at least one memory including instructions that, when executed by the at least one processor, cause the system to:
receive first input data representing a vocal characteristic and a request to output content corresponding to the vocal characteristic;
perform natural language understanding (NLU) processing using the first input data to determine an intent to perform speech synthesis corresponding to the vocal characteristic represented in a portion of the first input data;
based at least in part on determining the intent to perform speech synthesis corresponding to the vocal characteristic represented in the portion of the first input data, process the first input data to determine vocal characteristic data representing at least the vocal characteristic;
determine, using a trained model and the vocal characteristic data, a model output data;
receive second input data corresponding to a speech synthesis task;
determine, using an encoder and the second input data, encoded data; and
determine, using a decoder, the model output data and the encoded data, synthesized speech data corresponding to the vocal characteristic.

16. The system of claim 15, wherein the first input data comprises audio data and wherein the at least one memory further includes instructions that, when executed by the at least one processor, further cause the system to:
determine that the audio data represents an utterance;
process the audio data to determine prosody data; and
process the prosody data using a trained model to determine a portion of the vocal characteristic data.

17. The system of claim 15, wherein the at least one memory further includes instructions that, when executed by the at least one processor, further cause the system to:
prior to receiving the first input data, receive third input data;

determine, using NLU processing, that the third input data lacks a description of the vocal characteristic; and cause an indication of a request for the vocal characteristic to be sent to a local device.

18. The system of claim 15, wherein the encoder comprises a first encoder and a second encoder and wherein the at least one memory further includes instructions that, when executed by the at least one processor, further cause the system to:

determine, using the first encoder and the first input data, encoded linguistic data, wherein determination of the encoded data comprises processing, using the second encoder, the encoded linguistic data and the vocal characteristic data.

19. The system of claim 15, wherein the at least one memory further includes instructions that, when executed by the at least one processor, further cause the system to:

determine identification data indicating that the synthesized speech data includes a representation of synthesized speech;

determine modified synthesized speech data by processing the identification data with the synthesized speech data; and send the modified synthesized speech data.

20. The system of claim 15, wherein the first input data comprises a description of the vocal characteristic and wherein the at least one memory further includes instructions that, when executed by the at least one processor, further cause the system to:

determine a second vocal characteristic different from the description, wherein the vocal characteristic data further represents the second vocal characteristic.

21. The system of claim 15, wherein the encoder comprises a first encoder and a second encoder and wherein the at least one memory further includes instructions that, when executed by the at least one processor, further cause the system to:

determine, using the first encoder and the vocal characteristic data, encoded paralinguistic data, wherein determination of the encoded data comprises processing, using the second encoder, the encoded paralinguistic data and the vocal characteristic data.

22. The system of claim 15, wherein the portion of the first input data comprises audio data representing speech and wherein the at least one memory further includes instructions that, when executed by the at least one processor, further cause the system to:

determine that the intent indicates the vocal characteristic is to be determined to match a characteristic of the speech.

23. The system of claim 15, wherein the portion of the first input data comprises a description of the vocal characteristic and wherein the at least one memory further includes instructions that, when executed by the at least one processor, further cause the system to:

determine that the intent indicates the vocal characteristic is to be determined based at least in part on the description.

24. The system of claim 15, wherein the portion of the first input data comprises image data associated with the vocal characteristic and wherein the at least one memory further includes instructions that, when executed by the at least one processor, further cause the system to:

determine that the intent indicates the vocal characteristic is to be determined based at least in part on the image data.

* * * * *